(12) United States Patent
Morishita et al.

(10) Patent No.: US 7,964,666 B2
(45) Date of Patent: Jun. 21, 2011

(54) THERMOPLASTIC RESIN COMPOSITION

(75) Inventors: Takuya Morishita, Nagoya (JP); Akiyoshi Tamai, Nagoya (JP); Akiko Tanaka, Nagoya (JP); Makiko Saito, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 258 days.

(21) Appl. No.: 11/632,127

(22) PCT Filed: Jul. 14, 2005

(86) PCT No.: PCT/JP2005/012986
§ 371 (c)(1), (2), (4) Date: Jan. 18, 2007

(87) PCT Pub. No.: WO2006/009052
PCT Pub. Date: Jan. 26, 2006

(65) Prior Publication Data
US 2008/0071024 A1    Mar. 20, 2008

(30) Foreign Application Priority Data

Jul. 15, 2004 (JP) .............................. 2004-208195
Sep. 30, 2004 (JP) .............................. 2004-286521

(51) Int. Cl.
  *C08L 51/04* (2006.01)
  *C08L 77/00* (2006.01)
(52) U.S. Cl. .......... 525/66; 525/179; 528/310; 528/322; 522/164
(58) Field of Classification Search .................. 525/66, 525/179; 528/310, 322; 522/164
See application file for complete search history.

(56) References Cited

U.S. PATENT DOCUMENTS

| | | | |
|---|---|---|---|
| 4,713,415 A | 12/1987 | Lavengood et al. | 525/66 |
| 5,728,800 A * | 3/1998 | Gottschalk et al. | 528/310 |
| 5,756,576 A | 5/1998 | Bruls et al. | 525/66 |
| 5,837,772 A * | 11/1998 | Mc Kee et al. | 525/66 |
| 2004/0235999 A1 | 11/2004 | Vathauer et al. | 524/436 |

FOREIGN PATENT DOCUMENTS

| | | |
|---|---|---|
| EP | 0 068 132 A2 | 1/1983 |
| EP | 0 242 158 B1 | 1/1994 |
| EP | 1 544 248 A1 | 6/2005 |
| JP | 60-195157 A | 10/1985 |
| JP | 62-241945 A | 10/1987 |
| JP | 2-38441 A | 2/1990 |
| JP | 9-176414 A | 7/1997 |
| JP | 10-25414 A | 1/1998 |
| JP | 10-67902 A | 3/1998 |
| JP | 10067902 A * | 3/1998 |
| JP | 2000-17170 A | 1/2000 |
| JP | 2000-230092 A | 8/2000 |
| JP | 2001-152011 A | 6/2001 |
| JP | 2004-67753 A | 3/2004 |
| JP | 2004067753 A * | 3/2004 |
| JP | 2004-300354 A | 10/2004 |

OTHER PUBLICATIONS

Machine Translation of JP 10-067902.*

* cited by examiner

*Primary Examiner* — Vasu Jagannathan
*Assistant Examiner* — Mark S Kaucher
(74) *Attorney, Agent, or Firm* — Kubovcik & Kubovcik

(57) ABSTRACT

The present invention is a thermoplastic resin composition which is obtained by adding a specific modified vinyl copolymer having a specific intrinsic viscosity to a composition comprising a styrene-based resin and a polyamide resin. The thermoplastic resin composition has excellent flowability and has a far better surface appearance than conventional ones while satisfactorily retaining rigidity, heat resistance, chemical resistance, and impact resistance at room and low temperatures.

13 Claims, 1 Drawing Sheet

THERMOPLASTIC RESIN COMPOSITION

FIELD OF THE INVENTION

This invention relates to a thermoplastic resin composition in which a specified modified vinyl-based copolymer is added to a styrene-based resin and a polyamide resin.

BACKGROUND ART

Styrene-based resin is widely used as a general purpose resin because it is characterized in that it has a high rigidity, good appearance and is excellent in dimensional stability, and is low in water absorbance. However, the styrene-based resin is insufficient in chemical resistance, abrasion resistance and heat resistance and, in severe conditions, its use is restricted. On the other hand, crystalline thermoplastic resin compositions, especially, polyamide resin are widely used as an engineering plastic since it is excellent in chemical resistance, abrasion resistance and heat resistance, but it has a high water absorbance, and is not sufficient in rigidity and dimensional stability.

Under such a circumstance, resin compositions which have respective advantages of the styrene-based resin and the polyamide resin have been investigated, for example, a blend composition of an ABS resin, which is a representative styrene-based resin, and a polyamide resin is proposed. However, a simple blend of an ABS resin and a polyamide resin has problems that its mechanical properties are very low since their compatibility is inferior.

Under these circumstances, as a method for improving compatibility of ABS resin with polyamide resin, a method in which a monomer with a functional group which has an affinity to the polyamide resin is graft copolymerized to a rubbery polymer, and this graft copolymer is blended to the polyamide resin, is being investigated, and as one method thereof, a blend composition of a graft copolymer, in which an α,β-unsaturated carboxylic anhydride is graft copolymerized together with other monomer to a rubbery copolymer, and a polyamide resin is proposed. However, in the resin composition obtained in such a way, there are problems that it is insufficient in surface appearance, flowability and heat stability.

In addition, a blend composition of a graft copolymer, in which an unsaturated carboxylic acid amide together with other polymer is graft copolymerized to a rubbery polymer, and a polyamide resin is also proposed. However, this composition is insufficient in impact resistance and, furthermore, there are problems in surface appearance and mechanical properties when water is absorbed.

In such a circumstance, for the purpose of improving mechanical properties when water is absorbed, a resin composition comprising three components, in which a copolymer comprising an aromatic vinyl and an α,β-unsaturated carboxylic anhydride is used as a compatibility improver for the styrene-based resin and the polyamide resin, is proposed (for example, refer to the patent reference 1). However, this resin composition is insufficient in impact resistance at low temperature, flowability and surface appearance which are required when applications to interior or exterior materials for automobiles or housing, parts or the like of electric and electronic devices are desired.

For the purpose of improving impact resistance, for example, a resin composition in which a low molecular weight copolymer comprising an aromatic vinyl and α,β-unsaturated carboxylic acid and/or α,β-unsaturated carboxylic anhydride are added to the styrene-based resin and the polyamide resin, is proposed (for example, refer to the patent reference 2). However, this resin composition in which vinyl cyanide-based monomer is not contained in the above-mentioned copolymer was insufficient in impact resistance at low temperature and surface appearance.

On the other hand, a resin composition of which impact resistance is further improved by adding a styrene-acrylonitrile-maleic anhydride copolymer, having a maleic anhydride content of 0.3 to 1.5 mol % and an weight average molecular weight of about 40,000 to about 200,000, to ABS resin and polyamide resin is proposed (for example, refer to the patent reference 3). However, by adding the styrene-acrylonitrile-maleic anhydride copolymer of such molecular weight range, a resin composition which has an impact resistance at low temperature, flowability and surface appearance in good balance could not be obtained.

Furthermore, in order to improve impact resistance at low temperature, a resin composition of which impact resistance is further improved by adding styrene-acrylonitrile-maleic anhydride copolymer having an weight average molecular weight of 160,000 to about 230,000 to ABS resin and polyamide resin is proposed (for example, refer to the patent reference 4). However, with respect to this resin composition, too, by adding the styrene-acrylonitrile-maleic anhydride copolymer of such molecular weight range, flowability and surface appearance, especially, surface glossiness was not sufficient for the above-mentioned application.

In order to obtain a resin composition excellent in balance of impact resistance and flowability, a resin composition in which an agglomerated rubber, in which a small particle rubber of a specified particle diameter is agglomerated by compounding α,β-unsaturated carboxylic acid containing a copolymer of a specified reduced viscosity, for example, by compounding a styrene-acrylonitrile-methacrylic acid copolymer, is used, is reported (for example, refer to the patent reference 5). However, with respect to this resin composition, although flowability is improved, impact resistance and surface appearance, especially, surface glossiness was still insufficient for the above-mentioned application.

A resin composition in which a polyamide resin and a copolymer containing α,β-unsaturated carboxylic acid and/or α,β-unsaturated carboxylic anhydride are added to a styrene-based resin containing a rubber is disclosed (for example, refer to the patent reference 6). However, since it is intended in this invention to obtain a resin composition excellent in transparency, the aromatic vinyl monomer content contained in the rubber reinforced styrene-based resin is kept small and the impact resistance at room and low temperatures was inferior.

| [Patent reference 1] | JP-A-S60-195157 |
|---|---|
| [Patent reference 2] | Specification of EP-A-0068132 |
| [Patent reference 3] | Specification of U.S. Pat. No. 4713415 |
| [Patent reference 4] | Specification of U.S. Pat. No. 5756576 |
| [Patent reference 5] | JP-A-2000-17170 |
| [Patent reference 6] | JP-A-2004-300354 |

DISCLOSURE OF THE INVENTION

Problem to be Solved by the Invention

The present invention, for obtaining a resin composition comprising a styrene-based resin and a polyamide resin, provides a thermoplastic resin composition excellent in flowability which further has a far better surface appearance, especially surface glossiness, than conventional ones, while well maintaining rigidity, heat resistance, chemical resistance and impact resistance at room and low temperatures.

Means for Solving the Problem

We, inventors of the present invention, intensively investigated to solve the above-mentioned problems, and as a result, found that, with respect to a composition comprising a styrene-based resin and a polyamide resin which contains a specific vinyl-based (co)polymer, it is possible to solve such problems and to obtain a thermoplastic resin composition excellent in flowability which further has a far better surface appearance than conventional ones, while maintaining rigidity, heat resistance, chemical resistance and impact resistance at room and low temperatures, by adding a modified vinyl-based copolymer, containing α,β-unsaturated carboxylic anhydride unit and vinyl cyanide-based monomer unit, of lower molecular range than that of conventional technology.

That is, the present invention is a thermoplastic resin composition characterized in that, with respect to 100 wt parts of a thermoplastic resin composition which consists of 1 to 99 wt % of a styrene-based resin (A), in which a graft (co)polymer (A-1) obtained by graft polymerizing to a rubbery polymer a monomer unit comprising 100 to 40 wt % of an aromatic vinyl-based monomer and 0 to 60 wt % of at least one other monomer and a vinyl-based (co)polymer (A-2) consisting of 100 to 50 wt % of an aromatic vinyl-based monomer and 0 to 50 wt % of at least one other monomer, are compounded and 99 to 1 wt % of a polyamide resin (B), 0.5 to 80 wt parts of a modified vinyl-based copolymer (C), which contains 1.5 to 10 wt % of α,β-unsaturated carboxylic anhydride unit and 0.5 to 60 wt % of vinyl cyanide-based monomer unit, is further contained and an intrinsic viscosity of the modified vinyl-based copolymer (C) dissolved in methylethyl ketone solvent and measured at 30° C. is in the range of 0.15 to 0.41 dl/g.

Effect of the Invention

According to the present invention, it is possible to obtain a thermoplastic resin composition excellent in flowability and has a far better surface appearance than conventional ones, while maintaining rigidity, heat resistance, chemical resistance and impact resistance at room and low temperatures. The thermoplastic resin composition of the present invention is useful in applications as interior or exterior materials for automobiles and as materials for housing, parts or the like of electric or electronic devices, since it is possible, by using this composition, to obtain a thin molded article, large molded article and complicated molded article having a good appearance.

EXPLANATION OF NUMERAL CODES

Figure 1:
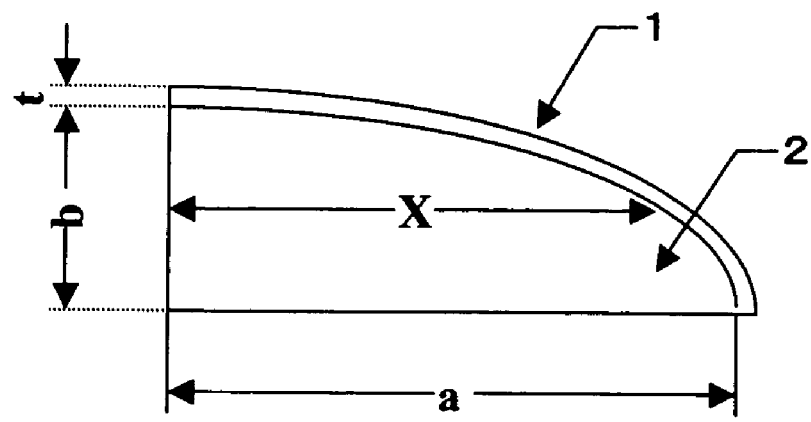
FIG. 1 A plane view of a ¼ elliptical jig used for the chemical resistance test

1. Test piece
2. ¼ elliptical jig
a. Longitudinal axis of the jig
b. Minor axis of the jig
t. Thickness of test piece
X. Longitudinal length of crack generating point
3. Portion where the polyamide resin (B) formed a continuous phase
4. Portion where the vinyl-based (co)polymer (A-2) formed a dispersed phase
5. Portion where the graft (co)polymer (A-1) formed a dispersed phase

BEST EMBODIMENT FOR CARRYING OUT THE INVENTION

The best embodiment for carrying out the thermoplastic resin composition of the present invention is explained below.

The styrene-based resin (A) used in the present invention is a resin in which the graft (co) polymer (A-1) and the vinyl-based (co)polymer (A-2) are compounded.

The graft (co)polymer (A-1) of the present invention is a rubbery polymer which is graft polymerized with a monomer unit comprising 100 to 40 wt % of an aromatic vinyl-based monomer and 0 to 60 wt % of other at least one monomer, i.e., it is a rubbery polymer which is graft polymerized with an aromatic vinyl-based monomer or with a monomer mixture containing 40 wt % or more of an aromatic vinyl-based monomer and at least one monomer other than the aromatic vinyl-based monomer.

As examples of the graft (co)polymer (A-1), an impact resistant polystyrene, a graft copolymers containing 40 wt % or more of an aromatic vinyl-based monomer, for example, ABS, AAS (acrylonitrile-acrylic rubber-styrene copolymer), AES (acrylonitrile-ethylene propylene rubber-styrene copolymer), MBS (methyl methacrylate-butadiene rubber-styrene copolymer) or the like are mentioned.

As the rubbery polymer constituting the graft (co)polymer (A-1), those having a glass transition point of 0° C. or lower are preferable. Concretely, diene-based block copolymers such as polybutadiene, a styrene-butadiene copolymer, an acrylonitrile-butadiene copolymer and a styrene-butadiene block copolymer, diene-based rubbers such as a butyl acrylate-butadiene copolymer, acrylic-based rubbers such as polybutyl acrylate and an alkyl acrylate-ally acrylate, polyisoprene, ethylene-α-olefin-based copolymer rubbers such as an ethylene-propylene-diene-based three components copolymer, ethylene-propylene copolymer and ethylene-propylene-(non-conjugated diene) copolymer, silicone rubbers such as polyorganosiloxane-based rubbery polymer latex, hydrogenated rubbers such as hydrogenated product of butadiene-based polymer, hydrogenated product of block copolymer of conjugated diene polymer block and aromatic vinyl-based compound polymer block and hydrogenated rubbers of block copolymer in which these blocks are combined, or the like, are mentioned. Among them, diene-based rubbers, ethylene-propylene-(non-conjugated diene) copolymers, hydrogenated diene-based polymers, silicone-based rubbers or acrylic-based rubbers are preferably used, and especially, polybutadiene or a butadiene copolymer is preferable. These can be used alone or in combination of two or more. As the non-conjugated diene component, 1,4-hexadiene, 5-ethylidene-2-norbornene, 5-vinyl norbornene and dicyclopentadiene or the like can preferably be used.

The rubbery particle diameter of such rubbery polymers are is not especially limited, but those having a weight average particle diameter of the rubbery particle of 0.05 to 0.7 μm, especially, 0.10 to 0.55 μm are preferable, since they are excellent in impact resistance. And, those in which both of a rubber having a weight average particle diameter of 0.20 to 0.25 μm and a rubber having a weight average particle diameter of 0.50 to 0.65 μm are used together in a weight ratio of 90:10 to 60:40 are preferably used, since they are very excellent in impact resistance and drop weight impact resistance of thin molded article. Furthermore, as the rubbery polymers, those agglomerated can be used.

Here, the weight average particle diameter of the rubbery particle can be determined by the sodium alginate method described in "Rubber Age Vol. 88 p. 484~490 (1960) by E. Schmidt, P. H. Biddison", that is, based on the fact that the particle diameter of creamed polybutadiene depends upon the concentration of sodium alginate, the particle diameter at 50% cumulative weight fraction was determined from the weight ratio of creamed polybutadiene and the cumulative weight fraction of the sodium alginate concentration.

As the aromatic vinyl-based monomers used for monomer unit to be graft polymerized to the graft (co)polymer (A-1), styrene, α-methylstyrene, vinyltoluene, o-ethylstyrene, p-t-butylstyrene, p-methylstyrene, chlorostyrene, bromostyrene or the like are mentioned, but styrene is especially preferable, and these can be used alone or in combination of two or more.

As the other at least one monomer used as monomer unit to be graft polymerized to the graft (co)polymer (A-1), for purpose of improving chemical resistance, vinyl cyanide-based monomer is especially preferably used. As vinyl cyanide-based monomers, acrylonitrile, methacrylonitrile, ethacrylonitrile or the like are mentioned, but acrylonitrile is especially preferable. And, (meth)acrylic ester-based monomers are also preferably used. As (meth)acrylic ester-based monomers, methyl, ethyl, propyl, n-butyl, isobutyl esters of acrylic acid or methacrylic acid, or the like are mentioned, but methyl methacrylate is especially preferable. Furthermore, as monomers other than the above, unsaturated carboxylic acids such as (meth) acrylic acid and their metal salts, glycidyl(meth) acrylate, glycidyl itaconate, ally glycidyl ether, styrene-p-glycidyl ether, p-glycidyl styrene, maleic acid, maleic anhydride, monomethyl maleate, monoethyl maleate, itaconic acid, itaconic anhydride, phthalic acid, 1,2-dimethyl maleic anhydride, phenyl maleic anhydride, N-methyl maleimide, N-ethyl maleimide, N-cyclohexyl maleimide, N-phenyl maleimide, acrylamide, methacrylamide, N-methyl acrylamide, butoxymethyl acrylamide, N-propyl methacrylamide, aminoethyl(meth)acrylate, propyl aminoethyl(meth)acrylate, 2-dimethyl aminoethyl(meth)acrylate, 2-diethyl aminoethyl(meth)acrylate, 2-dibutyl aminoethyl (meth)acrylate, 3-dimethyl aminopropyl(meth)acrylate, 3-diethyl aminopropyl(meth)acrylate, phenyl aminoethyl(meth)acrylate, cyclohexyl aminoethyl(meth)acrylate, N-vinyl diethylamine, N-acetyl vinylamine, allylamine, methallylamine, N-methyl allylamine, p-amino styrene, 2-isopropenyl-oxazoline, 2-vinyl oxazoline, 2-acroyl-oxazoline, 2-styryl-oxazoline, 3-hydroxy-1-propene, 4-hydroxy-1-butene, cis-4-hydroxy-2-butene, trans-4-hydroxy-2-butene, 3-hydroxy-2-methyl-1-propene, cis-5-hydroxy-2-pentene, trans-5-hydroxy-2-pentene, 4-dihydroxy-2-butene, ethylene, propylene, vinyl chloride, vinyl acetate, isopropenyl acetate, vinyl benzoate, polyethylene glycol (meth)acrylate, polypropylene glycol (meth)acrylate, polytetramethylene glycol methacrylate or the like can also be used. These can be used alone or in combination of two or more.

The graft (co)polymer (A-1) of the present invention can be obtained by graft (co)polymerizing preferably 90 to 20 wt parts, more preferably 60 to 20 wt parts, still more preferably, 50 to 20 wt parts of a monomer unit comprising 100 to 40 wt % of an aromatic vinyl-based monomer and 0 to 60 wt % of other at least one kind of monomer unit, in existence of preferably 10 to 80 wt parts of a rubbery polymer, more preferably, 40 to 80 wt parts, still more preferably, 50 to 80 wt parts. There is no specific limitation to the ratio of the rubbery polymer, but if it is less than 10 wt parts, the impact strength may decrease, and if it exceeds 80 wt parts, the surface appearance may become poor.

The amount of the aromatic vinyl-based monomer used for the graft (co)polymer (A-1) of the present invention is preferably, in the range of 40 to 95 wt %, more preferably, in the range of 50 to 80 wt %, still more preferably, in the range of 60 wt % to 75 wt %.

And, the amount of other at least one kind of monomer used for the graft (co)polymer (A-1) of the present invention is preferably, in the range of 60 to 5 wt %, more preferably, in the range of 50 wt % to 20 wt %, still more preferably, in the range of 40 wt % to 25 wt %.

The graft (co)polymer (A-1) may contain an ungrafted (co)polymer which is produced when 100 to 40 wt % of the aromatic vinyl-based monomer and 0 to 60 wt % of monomer component comprising the other monomer copolymerizable with it are (co)polymerized to the rubbery polymer. That is, it may contain an ungrafted (co)polymer in which monomers in the monomer mixture react with each other, and usually, those which are obtained as mixtures with the ungrafted (co)polymer can be used. The graft (co)polymer (A-1) of the present invention also includes those which are obtained as mixtures with this ungrafted monomer. Here, there is no specific limitation to the graft ratio, but it is preferably 10 to 150 wt % in view of impact strength. The graft ratio is calculated by the following formula.

Graft ratio=[amount of vinyl-based polymer graft polymerized to rubbery polymer]/[amount of rubber in graft (co)polymer]×100

There is no specific limitation to the intrinsic viscosity measured, by dissolving the graft (co)polymer (A-1) in methylethyl ketone solvent, at 30° C., but in view of the balance between impact resistance and molding processability, it is preferable to be in the range of 0.10 to 1.0 dl/g, more preferably, in the range of 0.15 to 0.70 dl/g, still more preferably, in the range of 0.15 to 0.48 dl/g.

There is no specific limitation to the producing method of the graft (co)polymer (A-1) and a bulk polymerization, a solution polymerization, a suspension polymerization, an emulsion polymerization, a precipitation polymerization, or combination thereof such as a bulk suspension polymerization are used. And, it is also possible to use by blending two kinds or more of the graft (co)polymers (A-1) separately graft (co)polymerized.

The vinyl-based (co)polymer (A-2) of the present invention comprises 100 to 50 wt % of an aromatic vinyl-based monomer and 0 to 50 wt % of other at least one kind of monomer, that is, it consists of the aromatic vinyl-based monomer, or a monomer mixture comprising 50 wt % or more of the aromatic vinyl-based monomer and the other at least one kind of monomer.

As examples of the vinyl-based (co)polymer (A-2), polystyrene, the following vinyl-based copolymers characterized by containing 50 wt % or more of an aromatic vinyl-based copolymer, AS (acrylonitrile-styrene copolymer), MS resin (methyl methacrylate-styrene copolymer), MAS resin (methyl methacrylate-acrylonitrile-styrene copolymer) or the like are mentioned.

As the aromatic vinyl-based monomers used for the vinyl-based (co)polymer (A-2), styrene, α-methylstyrene, vinyl toluene, o-ethyl styrene, p-t-butyl styrene, p-methyl styrene, chlorostyrene, bromostyrene or the like are mentioned. In particular, styrene is preferable. These can be used alone or in combination of two kinds or more.

As the other at least one kind of monomer used for the vinyl-based (co)polymer (A-2), vinyl cyanide-based monomers such as acrylonitrile, methacrylonitrile and ethacrylonitrile are especially preferably used in view of chemical resistance, and among them, acrylonitrile is most preferable. And, maleimide-based monomers such as N-phenyl maleimide, N-methyl maleimide, N-ethyl maleimide, N-butyl maleimide and N-cyclohexyl maleimide are also preferable for improving heat resistance and flame retardancy, and among them, N-phenyl maleimide is preferable. As monomers other than the above, (meth)acrylate-based monomers such as methyl, ethyl, propyl, n-butyl, isobutyl esters of acrylic acid or methacrylic acid, or the like, unsaturated carboxylic acid monomers such as (meth)acrylic acid and metal salts thereof, glycidyl(meth)acrylate, glycidyl itaconate, allyl glycidyl ether, styrene-p-glycidyl ether, p-glycidyl styrene, maleic acid, maleic anhydride, monomethyl maleate, monoethyl maleate, itaconic acid, itaconic anhydride, phthalic acid, 1,2-dimethyl maleic anhydride, phenyl maleic anhydride, acrylamide, methacrylamide, N-methyl acrylamide, butoxymethyl acrylamide, N-propyl methacrylamide, aminoethyl (meth)acrylate, propylaminoethyl(meth)acrylate, 2-dimethylaminoethyl(meth)acrylate, 2-diethylaminoethyl (meth)acrylate, 2-dibutylaminoethyl(meth)acrylate, 3-dimethylaminopropyl (meth)acrylate, 3-diethylaminopropyl (meth)acrylate, phenylaminoethyl(meth)acrylate, cyclohexyl aminoethyl(meth) acrylate, N-vinyl diethylamine, N-acetyl vinylamine, allylamine, methallylamine, N-methyl allylamine, p-aminostyrene, 2-isopropenyl oxazoline, 2-vinyl oxazoline, 2-acroyl oxazoline, 2-styryl oxazoline, 3-hydroxy-1-propene, 4-hydroxy-1-butene, cis-4-hydroxy-2-butene, trans-4-hydroxy-2-butene, 3-hydroxy-2-methyl-1-propene, cis-5-hydroxy-2-pentene, trans-5-hydroxy-2-pentene, 4-dihydroxy-2-butene, ethylene, propylene, vinylchloride, vinyl acetate, isopropenyl acetate, vinyl benzoate, polyethylene glycol (meth)acrylate, polypropylene glycol (meth)acrylate, polytetramethylene glycol (meth)acrylate or the like can be used. These can be used alone or in combination of two kinds or more.

With respect to the amount of the aromatic vinyl-based monomer used as the vinyl-based (co)polymer (A-2), it is necessary to be at least 50 wt % or more, in view of impact resistance and surface appearance of the resin composition of the present invention, especially in view of surface glossiness. It is preferably, 50 to 95 wt %, more preferably, 50 to 80 wt %, still more preferably, 60 wt % to 75 wt %.

And, the amount of other at least one kind of monomer used for the vinyl-based (co)polymer (A-2) is preferably, 5 to 50 wt %, more preferably, 20 to 50 wt %, still more preferably, 25 to 40 wt %.

There is no specific limitation to the intrinsic viscosity measured, by dissolving the vinyl-based (co)polymer (A-2) in methylethyl ketone solvent, at 30° C., but in view of the balance between impact resistance and molding processability, it is preferable to be in the range of 0.10 to 1.2 dl/g, more preferably, in the range of 0.15 to 0.70 dl/g, and when surface appearance, especially surface glossiness is considered, it is still more preferably, in the range of 0.15 to 0.55 dl/g, especially preferably, in the range of 0.15 to 0.50 dl/g.

There is no specific limitation to the producing method of the vinyl-based (co)polymer (A-2), for example, a (co) polymerization of the aromatic vinyl-based monomer or a monomer mixture containing 50 wt % or more of the aromatic vinyl-based monomer is used especially preferably, and other than that, methods for obtaining a desired vinyl-based (co) polymer (A-2) by further subjecting the vinyl-based (co) polymer obtained by the polymerization to a suitable reaction in a reactor, or the like are mentioned. For producing the vinyl-based (co)polymer (A-2), ordinary methods such as bulk polymerization, solution polymerization, suspension polymerization, precipitation polymerization, emulsion polymerization, or combination thereof such as a bulk suspension polymerization are adopted. There is no specific limitation to the feeding method of monomers, and they may be added together at first, or, to avoid a maldistribution of the copolymer components, the polymerization may be carried out while a part or whole monomers is fed continuously or stepwise. And, it is also preferable to use by blending two kinds or more of the vinyl-based (co)polymers (A-2) separately polymerized.

In the present invention, by using the vinyl-based (co) polymer (A-2) together with the copolymer (C), it is possible to improve flowability and surface appearance, especially surface glossiness of the obtained resin composition. The amount of the vinyl-based (co)polymer (A-2) is preferably 5 wt % or more in the styrene-based resin (A), in view of surface appearance, especially surface glossiness. A more preferable mixing ratio of the graft (co)polymer (A-1) and the vinyl-based (co)polymer (A-2) is 5 to 95 wt % of the graft (co) polymer (A-1) and 95 to 5 wt % of the vinyl-based (co) polymer (A-2), more preferably, 5 to 80 wt % of the graft (co)polymer (A-1) and 95 to 20 wt % of the vinyl-based (co)polymer (A-2), especially preferably, 40 to 80 wt % of the graft (co)polymer (A-1) and 60 to 20 wt % of the vinyl-based (co)polymer (A-2).

The polyamide resin (B) used in the present invention is a polymer comprising aminocarboxylic acid, lactam, or diamine and dicarboxylic acid as main starting materials. As representative raw materials of the polyamide resin (B) used in the present invention, an arbitrary combination of an aliphatic, alicyclic or aromatic diamine such as aminocarboxylic acids including 6-aminocapronic acid, 11-aminoundecanic acid, 12-aminododecanic acid or the like, lactams including ε-caprolactam, ω-laurolactam or the like, or tetramethylene diamine, hexamethylene diamine, ethylene diamine, trimethylene diamine, pentamethylene diamine, 2-methylpentamethylene diamine, undecamethylene diamine, dodecamethylene diamine, 2,2,4-trimethyl hexamethylene diamine, 2,4,4-trimethyl hexamethylene diamine, nonamethylene diamine, 5-methyl nonamethylene diamine, meta-xylylenediamine, para-xylylenediamine, 1,3-bis(aminomethyl) cyclohexane, 1,4-bis(aminomethyl)cyclohexane, 1-amino-3-aminomethyl-3,5,5-trimethyl cyclohexane, bis(4-aminocyclohexyl)methane, bis(3-methyl-4-aminocyclohexyl)methane, 2,2-bis(4-aminocyclohexyl) propane, bis(aminopropyl)piperazine, aminoethyl piperazine, with an aliphatic, alicyclic or aromatic dicarboxylic acid such as adipic acid, suberic acid, azelaic acid, sebacic acid, dodecane dioic acid, 1,3-cyclohexane dicarboxylic acid, 1,4-cyclohexane dicarboxylic acid, terephthalic acid, isophthalic acid, 2-chloroterephthalic acid, 2-methylterephthalic acid, 5-methyl isophthalic acid, 5-sodium sulfoisophthalate, hexahydroterephthalic acid, hexahydroisophthalic acid, are mentioned.

The polyamide resin (B) is obtained, from these raw materials, by well known condensation polymerization, and in this invention, each of polyamide homopolymers or copolymers obtained from these raw materials can be used alone or in a form of a mixture.

As preferable examples of the polyamide resin (B), polycaprolactam (Nylon 6), polyhexamethylene adipamide (Nylon 66), polyundecaneamide (Nylon 11), polydodecaneamide (Nylon 12), polyhexamethylene sebacamide (Nylon 610), and copolymers such as Nylon 6/66 copolymer, Nylon 6/66/610 copolymer, Nylon 6/12 copolymer, Nylon 66/hexamethylene isophthalamide (6I)/6 copolymer and Nylon 6/66/610/

12 copolymer, can be mentioned. Among them, Nylon 6, Nylon 66 and copolymers thereof are preferable, especially preferred are Nylon 6 and copolymers thereof and most preferred is Nylon 6.

There is no specific limitation to the molecular weight of the polyamide resin (B), but it is preferable that the relative viscosity at 25° C. of the solution dissolved in 98% concentrated sulfuric acid at a concentration of 1 g/dl is in the range of 1.8 to 7.5. In view of flowability of the obtained resin composition, more preferably, it is 1.8 to 4.0, still more preferred is in the range of 1.8 to 2.8, especially preferred is in the range of 1.8 to 2.4, and most preferred is in the range of 1.8 to 2.3. If the relative viscosity exceeds 7.5, the flowability of the resin composition of the present invention may become poor. On the other hand, if the relative viscosity is less than 1.8, the mechanical properties of the resin composition of the present invention may become inferior. The melting point of the polyamide resin (B), can be determined by measuring the top of crystal fusion peak in nitrogen flow at a temperature elevating rate of 20° C./min, using a differential scanning calorimeter (DSC-7 type of Perkin Elmer), and it is preferable that said melting point is 150 to 280° C. And, the melt viscosity of the polyamide resin (B) used in the present invention, at melt processing temperature, in a shear rate of 1000 $\sec^{-1}$, is preferably 15 to 600 Pa·s, more preferred is 15 to 250 Pa·s, still more preferred is 15 to 200 Pa·s, especially preferred is 15 to 150 Pa·s and most preferred is 15 to 100 Pa·s.

The modified vinyl-based copolymer (C) of the present invention (may simply be referred to as copolymer (C) below) contains 1.5 to 10 wt % of $\alpha,\beta$-unsaturated carboxylic anhydride unit and 0.5 to 60 wt % of vinyl cyanide-based monomer unit.

The $\alpha,\beta$-unsaturated carboxylic anhydride unit contained in the copolymer (C) is in the range of 1.5 to 10 wt %, preferably, in the range of 2 to 10 wt %, and more preferably, in the range of 2.5 to 10 wt %. In case where the $\alpha,\beta$-unsaturated carboxylic anhydride unit is less than 1.5 wt %, the impact strength of the obtained resin composition may decrease, since its reactivity, or reactivity and compatibility with the polyamide resin (B) decreases. If the $\alpha,\beta$-unsaturated carboxylic anhydride unit or its derivative unit exceeds 10 wt %, molding processability and impact resistance of final composition may become inferior.

The amount of the vinyl cyanide-based monomer unit in the copolymer (C) is in the range of 0.5 to 60 wt %, preferably, 0.5 to 50 wt %, and more preferably, 2 to 50 wt %. It is preferable that the lower limit of the amount of the vinyl cyanide monomer unit is 20 wt % or more in view of impact resistance and chemical resistance of the resin composition obtained by adding the copolymer (C), and in view of molding processability, its upper limit is preferably 50 wt % or less, especially preferably, 40 wt % or less. Accordingly, upon these considerations, the amount of the vinyl cyanide-based monomer unit is preferably in the range of 20 to 50 wt %, especially preferably, in the range of 20 to 40 wt %.

There is no specific limitation to the kind of the $\alpha,\beta$-unsaturated carboxylic anhydride unit contained in the copolymer (C), and for example, maleic anhydride, fumaric anhydride, itaconic anhydride, crotonic anhydride, methylmaleic anhydride, methylfumaric anhydride, mesaconic anhydride, citraconic anhydride, glutaconic anhydride, tetrahydrophthalic anhydride, 1,2-dimethyl maleic anhydride, phenylmaleic anhydride, endo-bicyclo-(2,2,1)-5-heptene-2,3-dicarboxylic anhydride, methyl-1,2,3,6-tetrahydrophthalic anhydride, 5-norbornene-2,3-dicarboxylic anhydride, methyl-5-norbornene-2,3-dicarboxylic anhydride, or the like are mentioned, and malic anhydride is especially preferable. These can be used alone or in combination of two kinds or more.

With respect to the copolymer (C), the $\alpha,\beta$-unsaturated carboxylic anhydride contained in the copolymer (C), may contain a derivative unit of $\alpha,\beta$-unsaturated carboxylic anhydride which is, for example, converted by reactions such as hydrolysis. These derivative units have chemical structures capable of being converted again, by a suitable vacuum drying treatment or heat treatment, into $\alpha,\beta$-unsaturated carboxylic anhydride. As the derivative units of $\alpha,\beta$-unsaturated carboxylic anhydride, $\alpha,\beta$-unsaturated carboxylic acid such as maleic acid, fumaric acid, itaconic acid, crotonic acid, methylmaleic acid, methylfumaric acid, mesaconic acid, citraconic acid, glutaconic acid, tetrahydrophthalic acid, endo-bicyclo-(2,2,1)-5-heptene-2,3-dicarboxylic acid, methyl-1,2,3,6-tetrahydrophthalic acid, 5-norbornene-2,3-dicarboxylic acid, methyl-5-norbornene-2,3-dicarboxylic acid, metal salts of these the $\alpha,\beta$-unsaturated carboxylic acids, monoalkyl esters of $\alpha,\beta$-unsaturated carboxylic acid such as monomethyl maleate, monoethyl maleate, monomethyl fumarate, monoethyl fumarate, monomethyl itaconate, monoethyl itaconate, monomethyl crotonate, monoethyl crotonate, monomethyl ester of methylmaleic acid, monomethyl ester of methyl fumaric acid, monomethyl mesaconate, monomethyl citraconate, monomethyl glutaconate, monomethyl tetrahydrophthalate, or metal salts of these monoalkyl esters, monoalkenyl esters of the $\alpha,\beta$-unsaturated carboxylic acid or metal salts thereof, monoallyl esters of the $\alpha,\beta$-unsaturated carboxylic acid or metal salts thereof, dialkyl esters of $\alpha,\beta$-unsaturated carboxylic acid, or the like, can be mentioned.

As the vinyl cyanide monomer units in the copolymer (C), acrylonitrile, methacrylonitrile, ethacrylonitrile or the like are mentioned, but preferably, it is acrylonitrile.

The copolymer (C) may contain an aromatic vinyl-based monomer unit. In case where the aromatic vinyl-based monomer unit is contained in the copolymer (C), its content is preferably in the range of 30 to 98 wt %, more preferably, 30 to 97.5 wt %, more preferably, 30 to 97 wt %, still more preferably, 50 to 97 wt %, especially preferably, in the range of 50 to 78.5 wt %, most preferably, 50 to 78 wt %, and further, in the range of 50 to 77.5 wt %.

For the copolymer (C), as the aromatic vinyl-based monomer units preferably used as required, styrene, $\alpha$-methyl styrene, vinyl toluene, o-ethyl styrene, p-t-butyl styrene, p-methyl styrene, chlorostyrene, bromostyrene or the like are mentioned, but styrene and $\alpha$-methyl styrene are preferable, and more preferred is styrene. These can be used alone or in combination of two kinds or more.

Further, the copolymer (C) may contain other at least one kind of monomer capable of using together with the vinyl cyanide-based monomer unit. Concretely, (meth)acrylic acid, methyl (meth)acrylate, ethyl(meth)acrylate, n-propyl(meth)acrylate, n-butyl(meth)acrylate, n-hexyl(meth)acrylate, cyclohexyl (meth)acrylate, chloromethyl(meth)acrylate, 2-chloroethyl (meth)acrylate, 2-hydroxyethyl(meth)acrylate, 3-hydroxypropyl (meth)acrylate, 2,3,4,5,6-pentahydroxyhexyl(meth)acrylate, 2,3,4,5-tetrahydroxypentyl(meth)acrylate, acrylic acid or metal salt thereof, methacrylic acid and metal salt thereof, t-butyl (meth)acrylate, aminoethyl(meth)acrylate, propyl aminoethyl (meth)acrylate, dimethyl aminoethyl(meth)acrylate, diethyl aminoethyl(meth)acrylate, 2-dibutyl aminoethyl(meth)acrylate, 3-dimethyl aminopropyl(meth)acrylate, 3-diethyl aminopropyl (meth)acrylate, phenyl aminoethyl(meth)acrylate, cyclohexyl aminoethyl (meth)acrylate, allyl glycidyl ether, styrene-p-glycidyl ether, monoethyl maleate, N-methyl maleimide, N-ethyl maleimide, N-cyclohexyl maleimide, N-phenyl maleimide, acrylamide, methacrylamide, N-methyl acrylamide, butoxymethyl acrylamide, N-propyl methacrylamide, N-vinyl diethylamine, N-acetyl vinylamine, allylamine, methallylamine, N-methyl allylamine, p-aminostyrene, 2-isopropenyl oxazoline, 2-vinyl oxazoline, 2-acroyl oxazoline, 2-styryl-oxazoline or the like can be mentioned. Among them, methacrylic acid, methyl methacrylate, N-methyl maleimide and N-phenyl maleimide are preferably used, and methyl methacrylate and N-phenyl maleimide are more preferably used. These can be used alone or in combination of two kinds or more.

The intrinsic viscosity measured, by dissolving the copolymer (C) of the present invention in methylethyl ketone solvent, at 30° C. is in the range of 0.15 to 0.41 dl/g. Preferably, it is in the range of 0.15 to 0.40 dl/g, more preferably, in the range of 0.15 to 0.36 dl/g, still more preferably, in the range of 0.15 to 0.30 dl/g, especially preferably, in the range of 0.15 to 0.25 dl/g, most preferably, in the range of 0.15 to 0.20 dl/g. In case where the intrinsic viscosity exceeds 0.41 dl/g, flowability and surface appearance of the resin composition becomes poor. On the other hand, in case where the intrinsic viscosity is lower than 0.15 dl/g, impact resistance and surface appearance becomes poor. Here, the intrinsic viscosity has the same meaning as inherent viscosity, and it is the limit value of reduced viscosity at limitless dilution, and can be calculated by measuring reduced viscosities at several arbitrarily selected concentrations. The reduced viscosity, $\eta r/c$, is the ratio of increased part of relative viscosity, $\eta r$, relative to the mass concentration of polymer material, c.

In general, it is known that an intrinsic viscosity of a polymer material has a certain correlation with its molecular weight, and the copolymer (C) of the present invention which is characterized by being its intrinsic viscosity in the above mentioned range can also be characterized by its molecular weight range. The molecular weight can be expressed by number average molecular weight or weight average molecular weight, but both can be obtained as values converted to those of polystyrene, by dissolving the copolymer (C) in tetrahydrofuran and measuring by a gel permeation chromatograph (GPC).

Concretely, the copolymer (C) of the present invention, of which intrinsic viscosity in methylethylketone solution at 30° C. is 0.15 to 0.41 dl/g, has a number average molecular weight of 4,000 to 20,000 and has a weight average molecular weight of 12,000 to 39,000. The preferable copolymer (C) of the present invention, of which said intrinsic viscosity is 0.15 to 0.40 dl/g, has a number average molecular weight of 4,000 to 19,000 and has a weight average molecular weight of 12,000 to 38,000. The more preferable copolymer (C) of the present invention, of which said intrinsic viscosity is 0.15 to 0.36 dl/g, has a number average molecular weight of 4,000 to 17,000 and has a weight average molecular weight of 12,000 to 36,000. The still more preferable copolymer (C) of the present invention, of which said intrinsic viscosity is 0.15 to 0.30 dl/g, has a number average molecular weight of 4,000 to 16,000 and has a weight average molecular weight of 12,000 to 34,000. The especially preferable copolymer (C) of the present invention, of which said intrinsic viscosity is 0.15 to 0.25 dl/g, has a number average molecular weight of 4,000 to 14,000 and has a weight average molecular weight of 12,000 to 31,000. The most preferable copolymer (C) of the present invention, of which said intrinsic viscosity is 0.15 to 0.20 dl/g, has a number average molecular weight of 4,000 to 9,000 and has a weight average molecular weight of 12,000 to 19,000.

The method for producing the copolymer (C) of the present invention, which has a desired range of intrinsic viscosity, is not especially limited, but by applying well known methods including, at polymerization, controlling pyrolysis temperature and an amount to be added of a radical polymerization initiator such as an azo compound or a peroxide, controlling an amount to be added of a chain transfer agent such as an alkyl mercaptan, carbon tetrachloride, carbon tetrabromide, dimethyl acetamide, dimethyl formamide or triethyl amine, or, in case where a solvent is used at polymerization, controlling the amount of the solvent, the copolymer (C) having an intrinsic viscosity of the desired range can be obtained. Among them, in view of stability of polymerization and maintaining the polymerization speed, the method of adding a chain transfer agent can more preferably be applied, and as the chain transfer agent here, in particular, an alkyl mercaptan is preferably used. As the alkyl mercaptane used here, for example, n-octyl mercaptane, t-dodecyl mercaptane, n-dodecyl mercaptane, n-tetradecyl mercaptane, n-octadecyl mercaptane or the like are mentioned, but n-octyl mercaptane, t-dodecyl mercaptane and n-dodecyl mercaptane are more preferable.

The amount to be added of the alkyl mercaptan at producing the copolymer (C) of the present invention can suitably be decided with respect to a desired intrinsic viscosity of the copolymer (C), according to pyrolysis temperature and amount to be added of the radical polymerization initiator, kind of the alkyl mercaptane, polymerization temperature, monomer concentration, etc.

For example, in case where the copolymer (C) is produced by solution polymerization, 120 wt parts of methylethyl ketone with respect to 100 wt parts of monomer mixture fed to the reaction system is used, and as an initiator, 0.3 wt parts of 2,2'-azobisisobutylonitrile is used, and, in case where the polymerization is carried out at 80° C., in case where the copolymer (C) of which intrinsic viscosity in methylethyl ketone at 30° C. is in the range of 0.15 to 0.4 dl/g is produced, the amount to be added of t-dodecyl mercaptan is controlled to the range of 0.1 to 0.8 wt parts with respect to 100 wt parts of the total monomer mixture fed to the reaction system. And, in case where the copolymer (C) of which intrinsic viscosity is in the range of 0.15 to 0.36 dl/g, is produced, t-dodecyl mercaptan is controlled to the range of 0.15 to 0.8 wt parts. In addition, in the same solution polymerization, for producing the copolymer (C) of which intrinsic viscosity is in the range of 0.15 to 0.3 dl/g, the t-dodecyl mercaptan is controlled to the range of 0.2 to 0.8 wt parts.

Furthermore, for example, in case where the copolymer (C) is produced by a bulk polymerization at 80° C. using 0.3 wt parts of 2,2'-azobisisobutylonitrile as initiator, for producing the copolymer (C) of which intrinsic viscosity in methylethyl ketone at 30° C. is in the range of 0.15 to 0.40 dl/g, the amount to be added of t-dodecyl mercaptan is controlled to the range of 0.35 to 2.5 wt parts with respect to 100 wt parts of total monomer mixture fed to the reaction system. And, for producing the copolymer (C) of which intrinsic viscosity is in the range of 0.15 to 0.36 dl/g, t-dodecyl mercaptan is controlled to the range of 0.5 to 2.5 wt parts. In addition, for producing the copolymer (C) of which intrinsic viscosity is in the range of 0.15 to 0.30 dl/g, t-dodecyl mercaptan is controlled to the range of 0.75 to 2.5 wt parts.

It is preferable that the $\alpha,\beta$-unsaturated carboxylic anhydride unit and the vinyl cyanide-based monomer unit of the copolymer (C) are introduced into the main chain of the copolymer by a random polymerization. As to the polymerization method of this case, for example, radical polymerizations such as a bulk polymerization, a solution polymerization, a suspension polymerization, a precipitation polymerization, an emulsion polymerization, or combinations thereof such as a bulk suspension polymerization, can be applied, but a bulk polymerization, a solution polymerization, a bulk suspension polymerization or a precipitation polymerization, can preferably be applied. In addition, any of batch-wise system and continuous system can preferably be applied. Depending on the polymerization method, the copolymer (C) may be in a form of a mixture which contains a copolymer containing no unsaturated carboxylic anhydride monomer unit. There is no specific limitation to the particle size and shape of the polymer obtained by the bulk suspension polymerization or precipitation polymerization, but it is preferable that the particle size of the obtained polymer is in the range of 0.1 μm to 8 mm and more preferably, in the range of 1 μm to 5 mm. In case where the particle size is smaller than 0.1 μm, for example, clogging arises in filtering process or handling may become difficult at treatment after the polymerization such as drying process. On the other hand, in case where the particle size exceeds 8 mm, drying efficiency at polymer drying process may decrease, or washing efficiency may also decrease when washing is carried out. Furthermore, the particle size mentioned here means the average diameter of polymer particles obtained by precipitation polymerization.

In addition, as to feeding method of each monomer at the polymerization, there is no specific limitation and they may be fed together at first, or, for preventing a maldistribution of the copolymer components, the polymerization may be carried out while a part or whole of the monomers is fed continuously or stepwise. For example, in case where the copolymer (C) is a copolymer copolymerized with an α,β-unsaturated carboxylic anhydride, a vinyl cyanide-based monomer and an aromatic vinyl-based monomer, if the monomer mixture is fed together at first in the polymerization, the respective compositions may differ greatly between the copolymer produced in the first half of the polymerization such as, for example, at polymerization ratio of less than 30%, and the copolymer produced in the second half of the polymerization such as, for example, at polymerization ratio of 60% or more. To prevent the maldistribution of the composition, it is preferable to additionally add the aromatic vinyl-based monomer and α,β-unsaturated carboxylic anhydride during the polymerization. In addition, as the copolymer (C) to be compounded, it is possible to use two or more of separately polymerized copolymers (C) by blending.

In a quantitative analysis of respective components of the copolymer (C) of the present invention, it is possible to use an infrared spectrophotometer, a proton nuclear magnetic resonance spectrometer (1H-NMR) or a gas chromatography or the like. The quantitative analysis of the α,β-unsaturated carboxylic anhydride unit in the copolymer (C) can be carried out as follows.

(i) By mixing the α,β-unsaturated carboxylic anhydride and the vinyl cyanide-based monomer at various molar ratios, and measuring the infrared spectra, a calibration curve of the peak intensity ratio of their characteristic absorptions, of the α,β-unsaturated carboxylic anhydride unit and the vinyl cyanide-based monomer, versus their molar ratio is prepared.

(ii) Then the infrared spectrum of the copolymer (C) is obtained and by using the calibration curve, the molar ratio of the α,β-unsaturated carboxylic anhydride unit and the vinyl cyanide-based monomer unit, which additively reacted and contained in the copolymer (C), is calculated.

(iii) Next, as to the other component units of the copolymer (C), their molar ratios to the vinyl cyanide-based monomer are calculated in the same way, and based on those results, the content of the α,β-unsaturated carboxylic anhydride unit is calculated.

At this time, in order to prepare calibration curves of infrared spectrum, it is possible, for the α,β-unsaturated carboxylic anhydride, to use the peak of characteristic absorption based on the stretching vibration of carbonyl group, for vinyl cyanide-based monomer unit, to use the peak of characteristic absorption based on the stretching vibration of CN group and for the aromatic vinyl monomer, to use the peak of characteristic absorption based on the C=C in-plane vibration of aromatic group.

In the present invention, 0.1 to 150 wt parts of a filler (D) with respect to 100 wt parts in total of the styrene-based resin (A), polyamide resin (B) and the copolymer (C), can be included. More preferable amount of the filler (D) is 1 to 100 wt parts. By including the filler (D), it is possible to greatly improve rigidity, heat resistance or the like of the obtained resin composition. The thermoplastic resin composition of the present invention containing the filler (D) has an excellent coatability by containing the copolymer (C).

The filler (D) may be fibrous or non-fibrous such as granular or the like.

As the fibrous fillers, metal fibers such as glass fiber, carbon fiber, stainless steel fiber and aluminum fiber, organic fibers such as an aromatic polyamide fiber, polyphenylene sulfide fiber and liquid crystal polyester fiber, whiskers such as potassium titanate whisker, aluminum borate whisker and silicone nitride whisker, and fibrous minerals such as wollastonite, asbestos and sepiolite, are mentioned, and these may be hollow. Among them, glass fiber or carbon fiber of chopped strand type or the like are preferably used. As carbon fibers, PAN-based, pitch-based, cellulose-based or the like are mentioned and metal coated carbon fiber can also be used. Among them, PAN-based carbon fiber which has high mechanical properties is preferable.

In case where a carbon fiber is used as the filler (D), carbon fibers having number average fiber diameter in the range of 1 to 20 μm are preferable. There is no specific limitation to the fiber length of the carbon fiber, but it is preferable to be 0.2 to 20 mm in weight average fiber length, and more preferably, 3 to 8 mm. If the weight average fiber length exceeds 10 mm, molding processability may become worse.

And, in case where a glass fiber is used as the filler (D), in general, any of publicly known glass fibers can be used, but E-glass is preferable. There is no specific limitation to the fiber diameter of the glass fiber, but it is preferable to be 5 to 15 μm, and there is no specific limitation to the length, but 1.5 to 5 mm is preferable, and it is especially preferable that the glass fiber is treated with publicly known coupling agent, sizing agent or the like. It is preferable to pre-treat those fibrous fillers before use with publicly known coupling agent, in view of achieving more excellent mechanical properties.

As the non-fibrous fillers, silicates such as zeolite, sericite, kaolin, mica, pyrophyllite, bentonite, talc, alumina silicate, metal compounds such as alumina, silicon oxide, magnesium oxide, zirconium oxide, titanium oxide and iron oxide, carbonates such as calcium carbonate, magnesium carbonate and dolomite, sulfates such as calcium sulfate, aluminium sulfate, barium sulfate, hydroxides such as magnesium hydroxide, calcium hydroxide and aluminium hydroxide, and glass beads, ceramic beads, boron nitride, silicon carbide, zinc oxide, graphite, magnesia, wollastonite, silica or the like are mentioned. These non-fibrous fillers can be used alone or in combination of two kinds or more. Among these, talc, kaolin and mica are preferable and talc is especially preferable. There is no specific limitation to average particle size of talc, but it is preferable to be 0.5 to 8 μm. Furthermore, it is preferable that an average aspect ratio of the talc is 4 or more, and more preferably, it is 5 to 100. In addition, a talc of which ratio of $SiO_2$ and MgO is 92 wt % or more, in the components in which loss of firing is deducted, is preferable. In addition, in the present invention, by using the non-fibrous filler after subjecting to the surface treatment with a coupling agent and/or other surface treating agent, it is possible to enhance more the balance of properties or injection molding processability. There is no specific limitation to the coupling agent and/or other surface treatment agent, and conventionally known agents are preferably used.

In the thermoplastic resin composition of the present invention, it is preferable that the filler (D) disperses in the styrene-based resin (A) and/or polyamide resin (B), or at least, the filler (D) disperses in the polyamide resin (B). Furthermore, the dispersed state of the filler (D) is preferably a uniform dispersion. This state of dispersion can be confirmed by cutting out a thin section from the thermoplastic resin composition and by observing by an electron microscope.

There is no specific limitation to the method for adding the filler (D) and dispersing it in the thermoplastic resin composition of the present invention, but it is preferable that the filler (D) is dispersed in the polyamide resin (B) beforehand.

The thermoplastic resin composition of the present invention can contain a stratified silicate (E). It is possible to improve rigidity and heat resistance of the resin composition by containing the stratified silicate (E). The thermoplastic resin composition of the present invention which contains the stratified silicate (E) exhibits an excellent coatability by containing the copolymer (C).

As the stratified silicate (E) used in the present invention, a swellable stratified silicate is preferable. The swellable stratified silicate has a 2:1 type structure in which one plate-like crystalline layer consists of an octahedral sheet containing a metal such as aluminum, magnesium or lithium with its both sides laminated with a tetrahedral silicate sheet. Usually, exchangeable cations exist between the sheets of the plate-like crystalline layer. The size of one plate-like crystalline is, usually, 0.05 to 0.5 μm in width and 6 to 15 Å in thickness. And, those of which cation exchange capacity of the exchangeable cation is 0.2 to 3 meq/g are mentioned.

As examples of the stratified silicate (E), smectite-based clay minerals such as montmorillonite, beidellite, nontronite, saponite, hectorite and sauuconite, various clay minerals such as vermiculite, hollosite, kanemite, kenyait, zirconium phosphate and titanium phosphate, swellable micas such as Li-type fluorine taeniolite, Na-type fluorine taeniolite, Na-type tetrasilicic fluorine mica, and Li-type tetrasilicic fluorine mica, etc., are mentioned, and they may be natural ones or synthetic ones. Among them, smectite-based clay minerals such as montmorillonite and hectorite or swellable micas such as, Na-type tetrasilicic fluorine mica and Li-type taeniolite are preferable, and montmorillonite is more preferable.

Furthermore, as the stratified silicate (E) of the present invention, it is preferable that the exchangeable cation which is present between the layers is exchanged with organic onium ion. As the organic onium ions, ammonium ion, phosphonium ion, sulfonium ion or the like are mentioned. Among them, ammonium ion and phosphonium ion are preferable and, especially, ammonium ion is desirably used. As the ammonium ion, it may be any of primary ammonium, secondary ammonium, tertiary ammonium and quaternary ammonium. Among these ammonium ions, quaternary ammonium ion is especially preferable, and concretely, trioctylmethylammonium, trimethyloctadecylammonium and benzyldimethyloctadecyl ammonium are preferable, especially, trioctylmethylammonium and benzyldimethyloctadecyl ammonium are preferable.

In the present invention, the stratified silicate (E) in which the exchangeable cation which is present between the layers is exchanged to organic onium ion can be produced by reacting a stratified silicate having a exchangeable cation between the layers with an organic onium ion by a publicly known method. In the present invention, the amount of the organic onium ion to the stratified silicate is usually in the range of 0.4 to 2.0 equivalent of the cation exchange capacity of the stratified silicate.

And, to those stratified silicates, further to the addition of the above-mentioned onium salt, it is preferable to use them upon pre-treating with a coupling agent having a reactive functional group for attaining better mechanical properties. As these coupling agent, conventionally known ones can be preferably used, but what is especially preferable is an organic silane-based compound. As treating method of the stratified silicates with those coupling agents, conventionally known methods can preferably be applied, and it is possible to further accelerate the reaction by heat treating the stratified silicates treated with those coupling agents.

At producing the thermoplastic resin composition, containing the stratified silicate (E), of the present invention, there is no specific limitation in a manner to disperse the stratified silicate (E) in the thermoplastic resin composition, but it is preferable to disperse the stratified silicate (E) in the polyamide (B) beforehand. There is no limitation in the manner to thus disperse the stratified silicate (E) in the polyamide resin (B) and conventionally known methods can be preferably applied, but a method of dispersing the stratified silicate (E) in the monomer which is the raw material of the polyamide resin (B) and then polymerizing the monomer mixture, or a method of melt-kneading the stratified silicate (E), of which exchangeable cation which is present between the layers is exchanged to organic onium ion beforehand, with the polyamide resin (B), is preferably applied. As for the producing method in which the stratified silicate (E) and the polyamide resin (B) are melt-kneaded, a method of treating with the organic onium ion when the stratified silicate (E) and the polyamide resin (B) are melt-kneaded, without exchanging beforehand the exchangeable cation which is present between the layers with the organic onium ion, may be applied.

In case where a coupling agent is used, there is no specific limitation to the order of treating the stratified silicate with the organic onium ion and treating with the coupling agent, but it is preferable to treat with the coupling agent after treating with the organic onium ion.

In the present invention, the amount of the stratified silicate (E) contained is, with respect to 100 wt parts of the thermoplastic resin composition which comprises 1 to 99 wt % of the styrene-based resin (A) and 1 to 99 wt % of the polyamide resin (B), 0.05 to 40 wt parts and preferably, 0.05 to 20 wt parts. If the amount of the stratified silicate (E) is less than 0.05 wt parts, improvements in rigidity and heat resistance are small, and if the amount of the stratified silicate exceeds 40 wt parts, surface appearance becomes poor.

In the present invention, in view of improving rigidity and heat resistance, while maintaining impact resistance and surface appearance of the obtained thermoplastic resin composition, it is preferable that the stratified silicate (E) uniformly disperses in the styrene-based resin (A), and/or the polyamide resin (B) in a level of 10 layers or less, more preferably, it uniformly disperses in a level of 6 layers or less, still more preferably, it uniformly disperses in a level of monolayer. And, it is preferable that the stratified silicate (E) uniformly disperses at least in the polyamide resin (B). In the present invention, the state of being dispersed uniformly in a level of monolayer means that the stratified silicate disperses in a state of about 1 to 5 layers without a secondary agglomeration. This state can be confirmed by cutting out a thin section from the resin composition and observing by an electron microscope.

To the thermoplastic resin composition of the present invention, if it is a resin which does not spoil the effect of the present invention, especially, rigidity, heat resistance, flowability and surface appearance, it is possible to add, as required, a resin in an amount which does not spoil those properties. As example of such resins, polyester resins such as polymethyl methacrylate, polycarbonate, polyethylene terephthalate, polybutylene terephthalate and polyarylate, and polyphenylene ether, polyphenylene sulfide, polyether sulfone, polyoxymethylene, polytetrafluoroethylene, polylactic acid, novolac epoxy phenol resin, polysulfone, polyimide, polyetherimide, polyetheretherketone, polyetheramide, polyamideimide or the like, can be mentioned.

Furthermore, to the thermoplastic resin composition of the present invention, in order to impart electrical conductivity, an electrically conductive filler and/or an electrically conductive polymer can be added. As for the electrically conductive filler, there is no specific limitation as far as it is used as an electrically conductive filler for making ordinary resins electrically conductive. As such examples, metal powder, metal flake, metal ribbon, metal fiber, metal oxide, inorganic filler coated with an electrically conductive material, carbon powder, graphite, carbon fiber, carbon flake, micaceous carbon, carbon fibril, carbon nanotube or the like, are mentioned and these may be hollow. As examples of the electrically conductive polymer, polyaniline, polypyrrole, polyacetylene, poly (p-phenylene), polythiophene, polyphenylene vinylene or the like can be mentioned. These electrically conductive fillers and/or electrically conductive polymers may also be used in combination of two kinds or more. Among these electrically conductive fillers and electrically conductive polymers, carbon black is especially preferably used in view of strength and cost.

The amount of the electrically conductive filler and/or electrically conductive polymer used in the present invention is suitably decided according to the kind of electrically conductive filler and/or electrically conductive polymer used, but in view of the balance of electric conductivity, flowability and mechanical strength, it is preferably in the range of 0.1 to 250 wt parts with respect to 100 wt parts of the thermoplastic resin composition comprising the styrene-based resin (A) and/or the polyamide resin (B), and especially preferably, in the range of 1 to 100 wt parts.

Furthermore, to the thermoplastic resin composition of the present invention, in the range which does not spoil the effect of the present invention, other component, for example, antioxidants or heat stabilizers such as sulfur containing compound-based, acrylate-based, phosphorous-based organic compounds, metallic stabilizers which include copper chloride, copper iodide and copper acetate or cerium stearate, may additionally be added.

In addition to that, as other components capable of being added, a weather resistant agent, an ultraviolet absorber, a light stabilizer, a releasing agent, a lubricant, a pigment, a fluorescent pigment, a dye, a fluorescent dye, a coloration inhibitor, a plasticizer, an antistatic agent (an ion-based antistatic agent, a nonionic antistatic agent such as polyoxyethylene sorbitan monostearate, a betaine-based amphoteric antistatic agent, a random or block polymer of polyamide elastomer such as polyether ester amide, polyamide ether, an olefin-based ether ester amide or olefin-based ether ester amide), a flame proofing agent (red phosphorous, a metal hydroxide-based flame proofing agent, a phosphorous-based flame proofing agent, a silicone-based flame proofing agent, a halogen-based flame proofing agent, a combination of halogen-based flame proofing agent and antimony trioxide, or the like), calcium carbonate, glass beads, wood powder, chaff powder, walnut powder, used paper, a luminous pigment, tungsten powder or tungsten alloy powder, boric acid glass, an antibacterial agents such as a silver-based antibacterial agent, an antifungal agent, or the like, can be added.

In the thermoplastic resin composition of the present invention, there is no specific limitation to the amount of the copolymer (C) if it is in the range of 0.5 to 80 wt parts with respect to 100 wt parts of the resin composition comprising the styrene-based resin (A) and the polyamide resin (B), but preferably, it is 0.5 to 30 wt parts, more preferably, 0.5 to 15 wt parts, still more preferably, 0.5 to 10 wt parts, especially preferably, 1 to 7 wt parts. If the copolymer (C) is less than 0.5 wt parts, the effect of addition as an compatibility improver is insufficient and the impact resistance of the obtained composition may decrease, and if it exceeds 80 wt parts the molding processability of the final composition may become poor.

In the thermoplastic resin composition of the present invention, there is no specific limitation to the mixing ratio of the styrene-based resin (A) and the polyamide resin (B) if it is in the range of 1 to 99 wt parts of styrene-based resin (A) and 99 to 1 wt parts of the polyamide resin (B), but preferably, 45 to 90 wt parts of the styrene-based resin (A) and 55 to 10 wt parts of the polyamide resin (B). In view of further improving the surface appearance, especially surface glossiness of the resin composition of the present invention, it is more preferably, 55 to 85 wt parts of the styrene-based resin (A) and 45 to 15 wt parts of the polyamide resin (B), still more preferably, 60 to 80 wt parts of the styrene-based resin (A) and 40 to 20 wt parts of the polyamide resin (B), especially preferably, 65 to 80 wt parts of the styrene-based resin (A) and 35 to 20 wt parts of the polyamide resin (B), and most preferably, 67 to 80 wt parts of the styrene-based resin (A) and 33 to 20 wt parts of the polyamide resin (B).

There is no specific limitation to the shape and phase structure of the molded article obtained by melt-molding the resin composition of the present invention, but in view of further improving the balance of impact resistance, flowability and surface appearance of the resin composition, the preferable resin composition of the present invention is such that, in center portion of a molded article obtained by subjecting the resin composition to the melt-mold processing, i.e., in a region of 40 to 60% depth of the total thickness when the direction perpendicular to the surface of the molded article is defined as thickness, the polyamide resin (B) forms a continuous phase. Concretely, in the phase structure of the center portion of the molded article, it is preferable that a continuous phase of the polyamide resin (B) is formed in 10 volume % or more, more preferably, it is formed in 20 volume % or more, most preferably, it is formed in 30 volume % or more.

As the resin composition of the present invention in case where the polyamide resin (B) forms a continuous phase, those of, preferably, 55 to 85 wt % of styrene-based resin (A) and 45 to 15 wt % of polyamide resin (B), more preferably, 60 to 80 wt % of styrene-based resin (A) and 40 to 20 wt % of polyamide resin (B), still more preferably, 65 to 80 wt % of styrene-based resin (A) and 35 to 20 wt % of polyamide resin (B), especially preferably, 67 to 80 wt % of styrene-based resin (A) and 33 to 20 wt % of polyamide resin (B), most preferably, 70 to 80 wt % of styrene-based resin (A) and 30 to 20 wt % of polyamide resin (B), are mentioned.

The preferable resin composition of the present invention is such that the graft (co)polymer (A-1) and/or the vinyl-based (co)polymer (A-2) forms a dispersed phase, in the center portion of the molded article obtained by subjecting the resin composition to melt-mold processing, i.e., in the region of 40 to 60% depth of the total thickness when the direction perpendicular to the surface of the molded article is defined as thickness. Concretely, in the phase structure of the center portion of the molded article, it is preferable that the dispersed phase of the graft (co)polymer (A-1) and/or the vinyl-based (co)polymer (A-2) is formed in 10 volume % or more, more preferably, it is formed in 30 volume % or more, especially preferably, it is formed in 50 volume % or more, most preferably, in 60 volume % or more.

Figure 2:
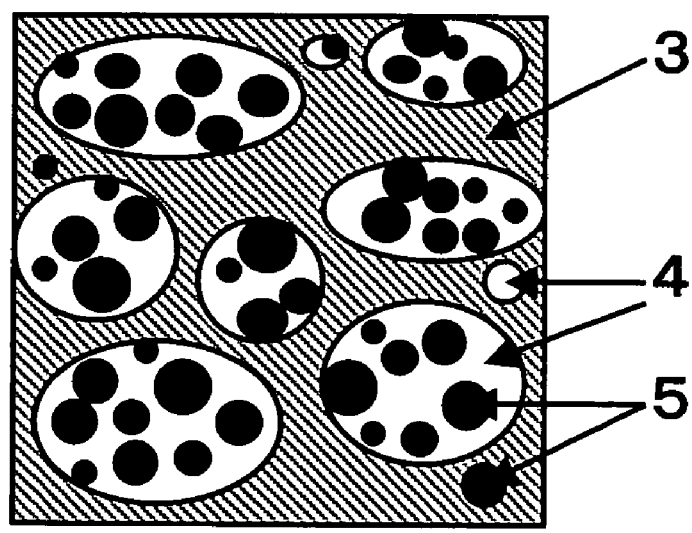
FIG. 2 A typical illustration of one of preferable phase structures formed in the center portion of a molded article of the thermoplastic resin composition of the present invention.

A typical illustration of an electron photomicrograph of the phase structure in which the polyamide (B) forms a continuous phase and the graft (co)polymer (A-1) and/or the vinyl-based (co)polymer (A-2) forms a dispersed phase in the polyamide (B), in the center portion of a molded article of the resin composition of the present invention, is shown in FIG. 2.

In FIG. 2, the portion indicated by the numerical code 3 is the polyamide resin (B) which forms a continuous phase. The portion indicated by the numerical code 4 is the vinyl-based (co)polymer (A-2) which forms a dispersed phase. The portion indicated by the numerical code 5 is the graft (co)polymer (A-1) which forms a dispersed phase. In case where the graft (co)polymer (A-1) is contained inside the vinyl-based (co)polymer (A-2), both of the graft (co)polymer (A-1) and the vinyl-based (co)polymer (A-2) are considered as the dispersed phase. The dispersed phase, which the graft (co) polymer (A-1) and/or the vinyl-based (co)polymer (A-2) form, means a phase in which, when observed in a specified region, the graft (co)polymer (A-1) and/or the vinyl-based (co)polymer (A-2) are in a state surrounded by the polyamide resin (B). In particular, in the present invention, it means the phase in which, when 10 μm×10 μm region of the center portion of a molded article of the resin composition is observed in an electron photomicrograph, the graft (co)polymer (A-1) and/or the vinyl-based (co)polymer (A-2) is in a state surrounded by the polyamide resin (B).

The preferable phase structure observed in the center portion of molded article of the thermoplastic resin composition of the present invention is not limited to the phase structure indicated in FIG. 2, and the shape of the graft (co)polymer (A-1) and/or the vinyl-based (co)polymer (A-2), which forms the dispersed phase, may be noncircular such as line-like, polygonal and elliptical. And, there is no specific limitation to the dispersed state of the copolymer (C), but it mainly is present at the interface of the polyamide resin (B) and the graft (co)polymer (A-1) and/or the vinyl-based (co)polymer (A-2). In addition, when the phase structure shown in FIG. 2 is formed in at least in part of the center portion of molded article, it is more likely to improve the impact resistance of the molded article when the graft (co)polymer (A-1) and/or the vinyl-based (co)polymer (A-2), which forms the dispersed phase, more uniformly disperses in the continuous phase of the polyamide resin (B) without agglomerating.

The phase structure of the resin composition of the present invention can be observed by an electron microscope. As the electron microscopes, TEM (transmission electron microscope) or SEM (scanning electron microscope) is mentioned. The volume ratio of the portion where the polyamide resin (B) forms the continuous phase, or the graft (co)polymer (A-1) and/or the vinyl-based (co)polymer (A-2) forms the dispersed phase can be calculated as a real the ratio of the portion where the polyamide resin (B) forms the continuous phase or the graft (co)polymer (A-1) and/or the vinyl-based (co)polymer (A-2) forms the dispersed phase, with respect to the total area of the electron photomicrograph.

In the present invention, in order to form such a specific phase structure, with respect to each melt viscosity of the styrene-based resin (A) and the polyamide resin (B) at a shear rate of 1,000 $sec^{-1}$, it is preferable to make the melt viscosity ratio, defined by <melt viscosity of the styrene-based resin (A)>/<melt viscosity of the polyamide resin (B)> at melt-molding processing temperature, 1.5 or more. More preferable melt viscosity ratio is 2.2 or more, still more preferably, it is 3.2 or more.

In case where the copolymer (C) is not added to the styrene-based resin (A) and the polyamide resin (B), too, by making the mixing ratio to 65 to 80 wt % of the styrene-based resin (A) and 35 to 20 wt % of the polyamide resin (B), and by controlling the melt viscosity ratio, defined by <melt viscosity of the styrene-based resin (A)>/<melt viscosity of the polyamide resin (B)> to 2.3 or more, it is possible to obtain a resin composition in which the polyamide resin (B) forms a continuous phase of 10 volume % or more in the center portion of molded article. To such a resin composition, by adding a copolymer other than the copolymer (C) of the present invention, which includes vinyl-based monomer units such as (meth)acrylic acid, maleic anhydride and glycidyl (meth)acrylate which have reactivity or compatibility with the polyamide resin (B), a resin composition excellent in impact resistance and flowability compared to conventionally known resin composition is obtained. However, these are inferior in flowability and surface appearance to the resin composition of the present invention.

As methods for producing the thermoplastic resin composition of the present invention, for example, such methods can be applied as, in which the styrene-based resin (A), the polyamide resin (B), the copolymer (C) and, if necessary, the filler (D), the stratified silicate (E) and/or other additives are, after uniformly mixed by such as a high speed mixer in a state of pellets, powder or small flakes, melt-kneaded by a single screwed or multi-screwed extruder with a vent heated to 210 to 330° C. having sufficient melt-kneading ability, or methods in which the mixture is melt-kneaded by a banbury mixer or rubber rolls. There is also no specific limitation to a screw arrangement of the extruder. And there is no specific limitation to the order of mixing of the styrene-based resin (A), the polyamide resin (B), the copolymer (C) and, if necessary, the filler (D), the stratified silicate (E) and/or other additives, and their states, and methods of mixing all these together at once or, after pre-mixing specified two or more components, mixing the remaining components, can be exemplified. And the filler (D) can be used together one or more kinds, if necessary, and there is no specific limitation to the order of their mixing and their states.

The molded article made by melt-molding processing of the thermoplastic resin composition of the present invention is that which is obtainable by adopting conventionally known molding methods such as injection molding, extrusion molding, blow molding, press molding, compression molding or gas assist molding. In these cases, the molding temperature is usually selected from the range of 210 to 330° C.

The thermoplastic resin composition of the present invention, because it is excellent in flowability, and further, it has a far more excellent surface appearance than conventional ones, while maintaining rigidity, heat resistance, chemical resistance and impact resistance at room or low temperatures, can be applied to various uses while making advantage of those properties, especially, can be advantageously applied to interior or exterior materials for automobiles, molded articles for housing, parts or the like of electric and electronic devices.

EXAMPLES

Hereunder, the present invention is explained in detail with reference to the examples. However, the present invention is not limited the examples described below. Before the description of each example, the determining methods of the various properties adopted in the examples are described.

Izod Impact Strength

The notched Izod impact strength was measured according to ASTM D256 with a molded article of ⅛ inch thickness. The measurements of the impact strength were carried out at room temperature (23° C.) and at a low temperature (−30° C.), respectively.

Flexural Modulus

It was measured according to ASTM D-790.

Heat Resistance

The heat deflection temperature was measured according to ASTM D-648 under a load of 4.6 kgf/cm$^2$ with a molded article of ¼ inch thickness.

Flowability

The melt flow rate was measured according to JIS K7210 B method under a load of 10 kgf. The melting temperatures at the measurement were shown below. They were adjusted to 250° C., when Nylon 6 resin was used and when a copolymer of Nylon 6 component and Nylon 66 component was used, and to 280° C. when Nylon 66 was used, as the polyamide resin (B).

Chemical Resistance

After the oblong test piece 1 (129 mm×12.6 mm; thickness t=1.5 mm) shown in FIG. 1 which is injection molded is fixed along with the ¼ elliptical jig 2 shown in FIG. 1, the surface of the test piece was coated with a liquid medicine, and after leaving for 24 hours under a circumstance of 23° C., a presence or absence of a craze or crack was checked and the critical strain ε (%) was calculated according to the formula 1 based on a, b, t and x shown in FIG. 1. As the liquid medicine, methanol and gasoline were used. Here, a, b, t, and X in FIG. 1 and the formula 1 denote the following meanings, respectively. As the jig, a jig of major axis a=123 mm and minor axis b=47 mm was used.

ε: critical strain (%)
a: major axis of jig (mm)
b: minor axis of jig (mm)
t: thickness of device (mm)
X: major length of crack generating point (mm)

[Formula 1]

$$\varepsilon\ (\%) = \frac{b \cdot t}{2a^2}\left(1 - \frac{X^2(a^2 - b^2)}{a^4}\right)^{-3/2} \times 100 \quad (1)$$

Surface Appearance 1

50 shots of injection molding were carried out and 50 samples of square plate of 80 mm length, 80 mm width and 3 mm thickness were obtained. The surface appearance of these square plates was evaluated by visual inspection. The criterion was set to 5 classes of 1 to 5 (class 5 is the best) according to number of samples, in 50 shots, in which one kind or more selected from a flow mark, silver streak and small scratch generated on the surface of the square plate. Class 5 means that the number of samples, in 50 shots, in which one kind or more selected from flow mark, silver streak and small scratch generated, is 0, class 4 means that the number of said samples, in 50 shots, is 1 to 10, class 3 means that the number of said samples, in 50 shots, is 11 to 40, class 2 means the number of said samples, in 50 shots, is 41 to 49, class 1 means that the number of said samples, in 50 shots, is 50. In case of the polyamide resin (B), the injection moldings were carried out, when Nylon 6 resin or a copolymer of Nylon 6 component and Nylon 66 component was used, at molding temperature of 250° C. and mold temperature of 70° C., and when Nylon 66 resin was used, at molding temperature of 280° C. and mold temperature of 80° C., respectively.

Surface Glossiness

With respect to the square plate of 80 mm length, 80 mm width and 3 mm thickness obtained by the above-mentioned injection molding, the surface glossiness was measured according to ASTM D256A at an incidence angle of 60°, using a digital variable gloss meter (model: UGV-5D of Suga Test Instruments). Regarding the surface glossiness (%), as the value becomes higher, the glossiness of the mirror surface becomes better and, in the present invention, the surface appearance becomes better.

Surface Appearance 2

50 shots of injection molding were carried out and 50 samples of square plate of 80 mm length, 80 mm width and 3 mm thickness were obtained. The surface appearance of these square plates was evaluated by visual inspection. The criterion was set to 5 classes of 1 to 5 (class 5 is the best) according to number of samples, in 50 shots, in which one kind or more selected from a flow mark, silver streak and small scratch generated on the surface of the square plate. Class 5 means that the number of samples, in 50 shots, in which one kind or more selected from the flow mark, silver streak and small scratch generated is 0, class 4 means that the number of said samples, in 50 shots, is 1 to 5, class 3 means that the number of said samples, in 50 shots, is 6 to 30, class 2 means that the number of said samples, in 50 shots, is 31 to 49, class 1 means that the number of said samples, in 50 shots, is 50. The injection molding was carried out at molding temperature of 250° C. and mold temperature of 70° C.

Coatability

After coating a square plate of 80 mm length, 80 mm width and 2 mm thickness with 2 liquid type paint of acrylic-urethane (Urethane PG60/hardener, Kansai Paint), it was dried under a condition of 80° C. for 2 hours. Then making a crosscut pattern of 1 mm squares (10×10 squares) according to the crosscut adhesion test defined in JIS K5400-1990 and the cellophane tape exfoliation test was carried out to evaluate the coatability by remained number of coating films. The evaluation standard was as follows. The remained number of coating films of 95 or more: ○, the remained number of coating films of 80 to 94: Δ, the remained number of coating films of 79 or less: x.

Melt Viscosity Ratio

Using a plunger type capillary rheometer (Capirograph Type 1C of Toyo Seiki Seisatu-sho), the respective melt viscosities (Pa·s) at melt-mold processing temperature at a shear rate of 1,000 sec$^{-1}$ of the styrene-based resin (A) and the polyamide resin (B) were measured and the melt viscosity ratio defined by <melt viscosity of the styrene-based resin (A)>/<melt viscosity of the polyamide resin (B)> was calculated.

Phase Structure 1 (Continuous Phase of the Polyamide Resin (B))

The polyamide resin (B) was dyed by dyeing a portion of 1.2 to 1.8 mm from surface in thickness direction (center portion) of ASTM No. 1 dumbbell (thickness 3 mm) with phosphotungstic acid. Next, the center portion of the molded article was observed by TEM (transmission electron microscope, type H-7100 of Hitachi). In the electron photomicrograph of the center portion of molded article thus obtained (the thickness of the photo is uniform), three portions (10 μm×10 μm range) were arbitrarily selected, and in the respective portions (10 μm×10 μm range) selected, dyed and continuous part which corresponds to the continuous phase was cut off, weighed its total weight and calculated its ratio to the total weight (10 μm×10 μm range) before cutting off said portion. This weight ratio can be understood as volume ratio since the thickness of said electron photomicrograph is uniform, therefore, the average value of those obtained at three arbitrarily selected portions by the same procedure was used as the ratio of volume (volume ratio) of the portion where the polyamide resin (B) forms a continuous phase in the center portion of molded article. In the phase structure of the center portion, the case in which the portion where the polyamide resin (B) forms the continuous phase is formed in 30 volume % or more, was classified as score 4, the case in which said continuous phase is 20 volume % or more and less than 30 volume %, was classified as score 3, the case in which said continuous phase is 10 volume % or more and less than 20 volume %, was classified as score 2, the case in which said continuous phase is less than 10 volume %, was classified as score 1, the case in which said continuous phase is not formed entirely, was classified as score 0.

Phase Structure 2 (Dispersed Phase of the Vinyl-Based (Co) Polymer (A-2))

In the same electron photomicrograph as that used in the analysis of the phase structure 1, three portions were arbitrarily selected, and in the respective portions (10 μm×10 μm range) selected, the part which is not dyed with phosphotungstic acid and which corresponds to the dispersed phase of the graft (co) polymer (A-1) and/or the vinyl-based (co)polymer (A-2) was cut off. At this time, when the graft (co)polymer (A-1) and/or the vinyl-based (co)polymer (A-2) extends to outside of the arbitrarily selected range of 10 μm×10 μm, if it is inside the arbitrary selected range of 10 μm×10 μm, it is considered as the dispersed phase and the part which is present in said range is cut off. The total weight of the cut part was measured and calculated the ratio of said part to the total weight (10 μm×10 μm range) before cutting off said part. This weight ratio can be understood as volume ratio since the thickness of said electron photomicrograph is uniform, therefore, the average value of those obtained at three arbitrarily selected portions by the same procedure was used as the volume ratio of the portion where the graft (co)polymer (A-1) and/or the vinyl-based (co)polymer (A-2) forms the dispersed phase in the center portion of molded article. The case in which the portion where the graft (co)polymer (A-1) and/or the vinyl-based (co)polymer (A-2) forms the dispersed phase is formed in 50 volume % or more, was classified as score 4, the case where said dispersed phase is 30 volume % or more and less than 50 volume %, was classified as score 3, the case where said dispersed phase is 10 volume % or more and less than 30 volume %, was classified as score 2, the case where said dispersed phase is 10 volume % or less, was classified as score 1, the case where said dispersed phase is not formed entirely, was classified as score 0.

Quantitative Analysis of α,β-Unsaturated Carboxylic Anhydride Unit in the Copolymer (C)

By mixing the α,β-unsaturated carboxylic anhydride and the vinyl cyanide-based monomer in various molar ratios, and measuring the infrared spectra, an infrared absorption spectrum calibration curve of the peak intensity ratio of their characteristic absorptions, of the α,β-unsaturated carboxylic anhydride unit and the vinyl cyanide-based monomer, versus their molar ratio was prepared. Next, the infrared spectrum of the copolymer (C) was obtained and by using the calibration curve, the molar ratio of the α,β-unsaturated carboxylic anhydride unit and the vinyl cyanide-based monomer, which reacted by addition and are contained in the copolymer (C), was calculated. Next, as to the other component units of the copolymer (C), their molar ratios to the vinyl cyanide-based monomer are calculated in the same way, and based on those results, the content of the α,β-unsaturated carboxylic anhydride unit were calculated. At this time, in order to prepare infrared absorption spectrum calibration curves, for the α,β-unsaturated carboxylic anhydride, the peak of characteristic absorption based on the stretching vibration of carbonyl group (about 1780 cm$^{-1}$), for vinyl cyanide based monomer unit, the peak of characteristic absorption based on the stretching vibration of CN group (about 2228 cm$^{-1}$) and in case where the aromatic vinyl monomer is contained, the peak of characteristic absorption based on the C=C in-plane vibration of aromatic group (about 1495 cm$^{-1}$), were used. In the copolymer (C), these peaks of characteristic adsorption were confirmed, at 1780 cm$^{-1}$ for α,β-unsaturated carboxylic anhydride unit, at 2238 cm$^{-1}$ for vinyl cyanide-based monomer unit, and at 1495 cm$^{-1}$ for the aromatic vinyl monomer unit.

Weight Average Molecular Weight 20 mg of the copolymer (C) was dissolved in 10 ml tetrahydrofuran solvent, and the weight average molecular weight was measured by a gel permeation chromatograph (pump: 515 type of Waters, column: TSK gel GMHHR-H(30) and TSK gel Multipore HXL-M of Tosoh Corp. were directly connected). The column temperature was 40° C. and a UV detector was used as the detector. The weight average molecular weight was determined by converting to that of polystyrene.

Styrene-Based Resin (A)

Reference Example 1

Preparation of Graft Copolymer (A-1) (a-1)

The following materials were fed to a polymerization container and heated to 65° C. while being stirred. When the inside temperature reached 65° C., it was considered as the starting point of polymerization, and 40 wt parts of a mixture consisting of 71 wt parts of styrene, 29 wt parts of acrylonitrile and 0.3 wt parts of t-dodecyl mercaptan was continuously dropped for 5 hours.

| | |
|---|---|
| Polybutadiene latex (weight average particle diameter 0.2 μm): | 60 wt parts (solid content) |
| Potassium oleate: | 0.5 weight parts |
| Glucose: | 0.5 wt parts |
| Sodium pyrophosphate: | 0.5 wt parts |
| Ferrous sulfate: | 0.005 wt parts |
| De-ionized water: | 120 wt parts |

In parallel with that, an aqueous solution consisting of 0.25 wt parts of cumene hydroxide, 2.5 wt parts of potassium oleate and 25 wt parts of pure water was continuously dropped for 7 hours to complete the reaction. The obtained graft copolymer latex was coagulated with sulfuric acid, and after neutralized with caustic soda, it was washed, filtered and dried to obtain a graft (co)polymer (a-1).

Acetone was added to a predetermined amount (m) the graft copolymer (a-1) and refluxed for 4 hours, and after separating this solution centrifugally at 8800 rpm (centrifugal force 10,000 G) for 40 minutes, the insoluble component was filtered. This insoluble component was vacuum dried at 70° C. for 5 hours and then the weight (n) was measured. The graft ratio calculated by the equation, graft ratio=[(n)−(m)×L]/[(m)×L]×100, was 37%. Here, L is the rubber content of the graft copolymer.

The above mentioned filtrate of the acetone solution was concentrated by a rotary evaporator, and a precipitate (acetone soluble component) was obtained. After vacuum drying this soluble component at 70° C. for 5 hours, it was adjusted to 0.4 g/100 ml (in methylethyl ketone, 30° C.), and the intrinsic viscosity measured by an Ubbelohde viscometer at 30° C. was 0.39 dl/g.

Reference Example 2

Preparation of Graft Copolymer (A-1) (a-2)

The following materials were fed to a polymerization container and heated to 65° C. while being stirred. When the inside temperature reached 65° C., it was considered as the starting point of polymerization, and 58 wt parts of a mixture consisting of 71 wt parts of styrene, 29 wt parts of acrylonitrile and 0.3 wt parts of t-dodecyl mercaptan was continuously dropped for 5 hours.

| | |
|---|---|
| Polybutadiene latex (weight average particle diameter 0.2 μm): | 42 wt parts (solid content) |
| Potassium oleate: | 0.5 weight parts |
| Glucose: | 0.5 wt parts |
| Sodium pyrophosphate: | 0.5 wt parts |
| Ferrous sulfate: | 0.005 wt parts |
| De-ionized water: | 120 wt parts |

In parallel with that, an aqueous solution consisting of 0.25 wt parts of cumene hydroxide, 2.5 wt parts of potassium oleate and 25 wt parts of pure water was continuously dropped for 7 hours to complete the reaction. The obtained graft copolymer latex was coagulated with sulfuric acid, and after neutralized with caustic soda, it was washed, filtered and dried to obtain a graft (co)polymer (a-2). Of the obtained graft copolymer (a-2), the graft ratio and the intrinsic viscosity calculated in the same way as those of the graft copolymer (a-1), were 48% and 0.43 dl/g, respectively.

Reference Example 3

Preparation of Graft Copolymer (A-1) (a-3)

A graft copolymer (A-3) of powder state was prepared according to the same way as that of the graft copolymer (a-1) except that the monomers fed were changed to 67 wt parts of styrene and 33 wt parts of acrylonitrile.

Of the obtained graft copolymer (a-3), the graft ratio and the intrinsic viscosity calculated in the same way as those of the graft copolymer (a-1), were 37% and 0.39 dl/g, respectively.

Reference Example 4

Preparation of Vinyl-Based (Co)Polymer (A-2) (a-4)

80 wt parts of acrylamide, 20 wt parts of methyl methacrylate, 0.3 wt parts of potassium persulfate and ion exchanged water 1,500 wt parts were fed to a reactor, replaced the gaseous phase in the reactor with nitrogen and maintained at 70° C. while stirring the reaction mixture. The reaction was continued until the monomers were completely converted to a polymer and an aqueous solution of two components copolymer of acrylamide and methyl methacrylate was obtained. By diluting with ion exchanged water, a solution, in which 0.05 parts of methyl methacrylate/acrylamide copolymer is dissolved in 165 parts of ion exchanged water, was obtained.

In a stainless steel autoclave of 20 liter volume equipped with a baffle and pfaudler type impellers, the solution, in which 0.05 parts of the obtained methyl methacrylate/acrylamide copolymer is dissolved in 165 parts of ion exchanged water, was stirred at 400 rpm, and the reaction system was replaced with nitrogen gas. Next, the following mixture was added while mixing the reaction system, heated to 60° C. and a suspension polymerization was started.

| | |
|---|---|
| Styrene: | 71 wt parts |
| Acrylonitrile: | 29 wt parts |
| t-dodecyl mercaptan: | 0.2 wt parts |
| 2,2'-azobisisobutylonitrile: | 0.4 wt parts |

After elevating the reaction temperature to 65° C. in 15 minutes, it was heated to 90° C. in 2 hours and maintained at 90° C. for 2 hours to complete the polymerization. The reaction system was cooled, the polymer was separated, washed, dried and obtained a vinyl-based copolymer (a-4) in beads state containing 71 wt % of styrene unit and 29 wt % of acrylonitrile unit. The polymer yield was 96%. This copolymer was adjusted to 0.4 g/100 ml (in methylethyl ketone, 30° C.), and the intrinsic viscosity measured by an Ubbelohde viscometer was 0.51 dl/g.

Reference Example 5

Preparation of Vinyl-Based Copolymer (A-2) (a-5)

In a stainless steel autoclave of 20 liter volume equipped with a baffle and pfaudler type impellers, the same solution used in the preparation of the vinyl-based copolymer (a-4), in which 0.05 parts of methyl methacrylate/acrylamide copolymer is dissolved in 165 parts of ion exchanged water, was stirred at 400 rpm, and inside the reaction system was replaced with nitrogen gas. Next, the following mixture was added while stirring the reaction system, heated to 60° C. and a suspension polymerization was started.

| | |
|---|---|
| Styrene: | 67 wt parts |
| Acrylonitrile: | 33 wt parts |
| t-dodecyl mercaptan: | 0.34 wt parts |
| 2,2'-azobisisobutylonitrile: | 0.4 wt parts |

After elevating the reaction temperature to 65° C. in 15 minutes, heated to 90° C. in 3 hours and maintained at 90° C. for 3 hours to complete the polymerization. The reaction system was cooled, the polymer was separated, it was washed, dried and obtained a vinyl-based copolymer (a-5) in beads state which contains 67 wt % of styrene unit and 33 wt % of acrylonitrile unit. The polymer yield was 97%. This copolymer was adjusted to 0.4 g/100 ml (in methylethyl ketone, 30° C.), and the intrinsic viscosity measured by an Ubbelohde viscometer was 0.34 dl/g.

Reference Example 6

Preparation of Vinyl-Based Copolymer (a-6) (for Comparative Examples)

In a stainless steel autoclave of 20 liter volume equipped with a baffle and pfaudler type impellers, the same solution used in the preparation of the vinyl-based copolymer (a-4), in which 0.05 parts of methyl methacrylate/acrylamide copolymer is dissolved in 165 parts of ion exchanged water, was stirred at 400 rpm, and inside the reaction system was replaced with nitrogen gas. Next, the following mixture was added while stirring the reaction system, heated to 60° C. and a suspension polymerization was started.

| | |
|---|---|
| Styrene: | 30 wt parts |
| Methyl methacrylate: | 40 wt parts |
| Acrylonitrile: | 30 wt parts |
| t-dodecyl mercaptan: | 0.34 wt parts |
| 2,2'-azobisisobutylonitrile: | 0.4 wt parts |

After elevating the reaction temperature to 65° C. in 15 minutes, heated to 90° C. in 3 hours and maintained at 90° C. for 5 hours to complete the polymerization. The reaction system was cooled, the polymer was separated, it was washed, dried, and obtained a vinyl-based copolymer (a-6) in beads state containing 30 wt % of styrene, 40 wt % of methyl methacrylate and 30 wt % of acrylonitrile. The polymer yield was 97%. This copolymer was adjusted to 0.4 g/100 ml (in methylethyl ketone, 30° C.), and the intrinsic viscosity measured by an Ubbelohde viscometer was 0.35 dl/g.

Copolymer (C)

Reference Example 7

Preparation of Copolymer (C) (c-1)

30 wt parts of styrene, 32.9 wt parts of acrylonitrile, 0.2 wt parts of maleic anhydride, 0.3 wt parts of t-dodecyl mercaptan and 0.3 wt parts of 2,2'-azobisisobutylonitrile were fed to a stainless steel autoclave equipped with a baffle and pfaudler type impellers in which 60 wt parts of methylethyl ketone had been fed, and this solution was heated to a temperature of 80° C. while stirring at 300 rpm. Then a solution, in which 34.6 wt parts of styrene, 2.3 wt parts of maleic anhydride, 0.2 wt parts of 2,2'-azobisisobutylonitrile were dissolved in 60 wt parts of methylethyl ketone, was continuously added for 5 hours. After the addition, the temperature was further maintained at 80° C. for three hours, and completed the polymerization. After cooling, the solution was poured into methanol of a five-fold equivalent, purified by reprecipitation, completely removed the solvent by drying, and obtained a copolymer (C) (c-1). The polymer yield was 93%. By infrared absorption spectrum measurement, the composition determined by an infrared absorption spectrum calibration curve was that which contains 64.8 wt % of styrene, 32.7 wt % of acrylonitrile and 2.5 wt % of maleic anhydride. And, the copolymer (C) (c-1) was adjusted to 0.4 g/100 ml (in methylethyl ketone, 30° C.), and the intrinsic viscosity measured by an Ubbelohde viscometer at 30° C. was 0.30 dl/g. Furthermore, the weight average molecular weight measured by gel permeation chromatograph was 34,000.

Reference Example 8

Preparation of Copolymer (C) (c-2)

70 wt parts of styrene, 28.5 wt parts of acrylonitrile, 1.5 wt parts of maleic anhydride, 0.35 wt parts of t-dodecyl mercaptan and 0.3 wt parts of 2,2'-azobisisobutylonitrile were fed to a stainless steel autoclave equipped with a baffle and pfaudler type impellers in which 80 wt parts of methylethyl ketone had been fed, and after this solution was heated to 80° C. while stirring at 300 rpm, maintained at 80° C. for 5 hours and the polymerization was completed. After cooling, the solution was poured into methanol of a five-fold equivalent, purified by reprecipitation, completely removed the solvent by drying, and obtained a copolymer (C) (c-2). The polymer yield was 94%. By infrared absorption spectrum measurement, the composition determined by an infrared absorption spectrum calibration curve was that which contains 70.7 wt parts of styrene unit, 27.8 wt parts of acrylonitrile unit and 1.5 wt parts of maleic anhydride. And, the copolymer (C) (c-2) was adjusted to 0.4 g/100 ml (in methylethyl ketone, 30° C.), and the intrinsic viscosity measured by an Ubbelohde viscometer at 30° C. was 0.34 dl/g. Furthermore, the weight average molecular weight measured by gel permeation chromatograph was 35,000.

Reference Example 9

Preparation of Copolymer (C) (c-3)

66.0 wt parts of styrene, 32.4 wt parts of acrylonitrile, 1.6 wt parts of maleic anhydride, 0.16 wt parts of t-dodecyl mercaptan and 0.3 wt parts of 2,2'-azobisisobutylonitrile were fed to a stainless steel autoclave equipped with a baffle and pfaudler type impellers in which 140 wt parts of methylethyl ketone had been fed, and after this solution was heated to 80° C. while stirring at 300 rpm, maintained at 80° C. for 5 hours and the polymerization was completed. After cooling, the solution was poured into methanol of a five-fold equivalent, purified by reprecipitation, completely removed the solvent by drying, and obtained a copolymer (C) (c-3). The polymer yield was 87%. By infrared absorption spectrum measurement, the composition determined by an infrared absorption spectrum calibration curve was that which contains 68.8 wt % of styrene unit, 29.7 wt % of acrylonitrile unit, and 1.5 wt % of maleic anhydride. And, the copolymer (C) (c-3) was adjusted to 0.4 g/100 ml (in methylethyl ketone, 30° C.), and the intrinsic viscosity measured by an Ubbelohde viscometer at 30° C. was 0.41 dl/g. Furthermore, the weight average molecular weight measured by gel permeation chromatograph was 39,000.

Reference Example 10

Preparation of Copolymer (C) (c-4)

30 wt parts of styrene, 30 wt parts of acrylonitrile, 0.3 wt parts of maleic anhydride, 0.6 wt parts of t-dodecyl mercaptan and 0.3 wt parts of 2,2'-azobisisobutylonitrile were fed to a stainless steel autoclave equipped with a baffle and pfaudler type impellers in which 60 wt parts of methylethyl ketone had been fed, and this solution was heated to 80° C. while stirring at 300 rpm. Next, a solution in which 37 wt parts of styrene, 2.7 wt parts of maleic anhydride and 0.2 wt parts of 2,2'-azobisisobutylonitrile are dissolved in 60 wt parts of methylethyl ketone was continuously added for 5 hours. After the addition, the temperature was maintained at 80° C. for 4 hours and the polymerization was completed. After cooling, the solution was poured into methanol of a five-fold equivalent, purified by reprecipitation, completely removed the solvent by vacuum drying at 80° C. for 15 hours, and obtained a copolymer (C) (c-4). The polymer yield was 93%. By infrared absorption spectrum measurement, the composition determined by an infrared absorption spectrum calibration curve was that which contains 67.0 wt parts of styrene unit, 30.0 wt parts of acrylonitrile unit and 3.0 wt parts of maleic anhydride. And, the copolymer (C) (c-4) was adjusted to 0.4 g/100 ml (in methylethyl ketone, 30° C.), and the intrinsic viscosity measured by an Ubbelohde viscometer at 30° C. was 0.25 dl/g. Furthermore, the weight average molecular weight measured by gel permeation chromatograph was 31,000.

Reference Example 11

Preparation of Copolymer (C) (c-5)

56 wt parts of styrene, 7.5 wt parts of acrylonitrile, 15 wt parts of methyl methacrylate, 1.5 wt parts of maleic anhydride, 0.26 wt parts of t-dodecyl mercaptan and 0.3 wt parts of 2,2'-azobisisobutylonitrile were fed to a stainless steel autoclave equipped with a baffle and pfaudler type impellers in which 80 wt parts of methylethyl ketone had been fed, and after this solution was heated to 80° C. while stirring at 300 rpm, the temperature was maintained at 80° C. for 7 hours and the polymerization was completed. After cooling, the solution was poured into methanol of a five-fold equivalent, purified by reprecipitation, completely removed the solvent by drying and obtained a copolymer (C) (c-5). The polymer yield was 98%. By infrared absorption spectrum measurement, the composition determined by an infrared absorption spectrum calibration curve was that which contains 56.5 wt % of styrene unit, 26.6 wt % of acrylonitrile unit, 15.4 wt % of methyl methacrylate and 1.5 wt % of maleic anhydride unit. And, the copolymer (C) (c-5) was adjusted to 0.4 g/100 ml (in methylethyl ketone, 30° C.), and the intrinsic viscosity measured by an Ubbelohde viscometer at 30° C. was 0.34 dl/g. Furthermore, the weight average molecular weight measured by gel permeation chromatograph was 35,000.

Reference Example 12

Preparation of Copolymer (C) (c-6)

38.5 wt parts of styrene, 28.0 wt parts of acrylonitrile, 1.0 wt parts of maleic anhydride, 0.7 wt parts of t-dodecyl mercaptan and 0.3 wt parts of 2,2'-azobisisobutylonitrile were fed to a stainless steel autoclave equipped with a baffle and pfaudler type impellers in which 60 wt parts of methylethyl ketone had been fed, and this solution was heated to 80° C. while stirring at 300 rpm. Next, a solution in which 30 wt parts of styrene, 2.5 wt parts of maleic anhydride and 0.2 wt parts of 2,2'-azobisisobutylonitrile are dissolved in 60 wt parts of methylethyl ketone was continuously added for 5 hours. The temperature was maintained at 80° C. for 9 hours and the polymerization was completed. After cooling, the solution was poured into methanol of a five-fold equivalent, purified by reprecipitation, completely removed the solvent by vacuum drying at 80° C. for 12 hours, and obtained a copolymer (C) (c-6). The polymer yield was 87%. By infrared absorption spectrum measurement, the composition determined by an infrared absorption spectrum calibration curve was that which contains 68.5 wt % of styrene unit, 28.0 wt % of acrylonitrile unit, and 3.5 wt % of maleic anhydride unit. And, the copolymer (C) (c-6) was adjusted to 0.4 g/100 ml (in methylethyl ketone, 30° C.), and the intrinsic viscosity measured by an Ubbelohde viscometer at 30° C. was 0.20 dl/g. Furthermore, the weight average molecular weight measured by gel permeation chromatograph was 19,000.

Reference Example 13

Preparation of Copolymer (C) (c-7)

38 wt parts of styrene, 29 wt parts of acrylonitrile, 0.5 wt parts of maleic anhydride, 0.65 wt parts of t-dodecyl mercaptan and 0.1 wt parts of 2,2'-azobisisobutylonitrile were fed to a stainless steel autoclave equipped with a baffle and pfaudler type impellers in which 60 wt parts of methylethyl ketone had been fed, and this solution was heated to 80° C. while stirring at 300 rpm. Next, a solution in which 30 wt parts of styrene, 2.5 wt parts of maleic anhydride and 0.3 wt parts of 2,2'-azobisisobutylonitrile are dissolved in 60 wt parts of methylethyl ketone was continuously added for 6 hours. After the addition, the temperature was maintained at 80° C. for 3 hours and the polymerization was completed. After cooling, the solution was poured into methanol of a five-fold equivalent, purified by reprecipitation, completely removed the solvent by drying, and obtained a copolymer (C) (c-7). The polymer yield was 91%. By infrared absorption spectrum measurement, the composition determined by an infrared absorption spectrum calibration curve was that which contains 68.1 wt % of styrene unit, 28.9 wt % of acrylonitrile unit, and 3.0 wt % of maleic anhydride unit. And, the copolymer (C) (c-7) was adjusted to 0.4 g/100 ml (in methylethyl ketone, 30° C.), and the intrinsic viscosity measured by an Ubbelohde viscometer at 30° C. was 0.23 dl/g. Furthermore, the weight average molecular weight measured by gel permeation chromatograph was 27,000.

Reference Example 14

Preparation of Copolymer (C) (c-8)

30 wt parts of styrene, 33.5 wt parts of acrylonitrile, 0.3 wt parts of maleic anhydride, 0.28 wt parts of t-dodecyl mercaptan and 0.3 wt parts of 2,2'-azobisisobutylonitrile were fed to a stainless steel autoclave equipped with a baffle and pfaudler type impellers in which 60 wt parts of methylethyl ketone had been fed, and this solution was heated to 80° C. while stirring at 300 rpm. Next, a solution in which 33.5 wt parts of styrene, 2.5 wt parts of maleic anhydride and 0.2 wt parts of 2,2'-azobisisobutylonitrile are dissolved in 60 wt parts of methylethyl ketone was continuously added for 5 hours. After the addition, the temperature was further maintained at 80° C. for 3 hours and the polymerization was completed. After cooling, the solution was poured into hexane of a five-fold equivalent, purified by reprecipitation, completely removed the solvent by drying, and obtained a copolymer (C) (c-8). The polymer yield was 93%. By infrared absorption spectrum measurement, the composition determined by an infrared absorption spectrum calibration curve was that which contains 63.4 wt % of styrene unit, 33.6 wt % of acrylonitrile unit, and 2.8 wt % of maleic anhydride unit. And, the copolymer (C) (c-8) was adjusted to 0.4 g/100 ml (in methylethyl ketone, 30° C.), and the intrinsic viscosity measured by an Ubbelohde viscometer at 30° C. was 0.30 dl/g. Furthermore, the weight average molecular weight measured by gel permeation chromatograph was 34,000.

Reference Example 15

Preparation of Copolymer (c-9) (for Comparative Example)

66.9 wt parts of styrene, 31.9 wt parts of acrylonitrile, 1.2 wt parts of maleic anhydride, 0.02 wt parts of t-dodecyl mercaptan and 0.3 wt parts of 2,2'-azobisisobutylonitrile were fed to a stainless steel autoclave equipped with a baffle and pfaudler type impellers in which 120 wt parts of methylethyl ketone had been fed and after this solution was heated to 80° C. while stirring at 300 rpm, maintained at 80° C. for 8 hours and the polymerization was completed. After cooling, the solution was poured into methanol of a five-fold equivalent, purified by reprecipitation, completely removed the solvent by drying, and obtained a copolymer (c-9). The polymer yield was 94%. By infrared absorption spectrum measurement, the composition determined by an infrared absorption spectrum calibration curve was that which contains 69.9 wt % of styrene unit, 28.9 wt % of acrylonitrile unit and 1.2 wt % of maleic anhydride unit. And, the copolymer (c-9) was adjusted to 0.4 g/100 ml (in methylethyl ketone, 30° C.), and the intrinsic viscosity measured by an Ubbelohde viscometer at 30° C. was 0.58 dl/g. The copolymer (c-9) differs from the copolymer (C) of the present invention in the content of α,β-unsaturated carboxylic anhydride.

Reference Example 16

Preparation of Copolymer (c-10) (for Comparative Example)

70.0 wt parts of styrene, 28.8 wt parts of acrylonitrile, 1.2 wt parts of maleic anhydride, 0.02 wt parts of t-dodecyl mercaptan and 0.3 wt parts of 2,2'-azobisisobutylonitrile were fed to a stainless steel autoclave equipped with a baffle and pfaudler type impellers in which 80 wt parts of methylethyl ketone had been fed, and after this solution was heated to 80° C. while stirring at 300 rpm, it was further maintained at 80° C. for 9 hours and the polymerization was completed. After cooling, the solution was poured into methanol of a five-fold equivalent, purified by reprecipitation, completely removed the solvent by drying, and obtained a copolymer (c-10). The polymer yield was 97%. By infrared absorption spectrum measurement, the composition determined by an infrared absorption spectrum calibration curve was that which contains 70.7 wt parts of styrene unit, 28.1 wt parts of acrylonitrile unit and 1.2 wt parts of maleic anhydride unit. And, the copolymer (c-10) was adjusted to 0.4 g/100 ml (in methylethyl ketone, 30° C.), and the intrinsic viscosity measured by an Ubbelohde viscometer at 30° C. was 0.69 dl/g. The copolymer (c-10) differs from the copolymer (C) of the present invention in the intrinsic viscosity and in the content of α,β-unsaturated carboxylic anhydride.

Reference Example 17

Preparation of Copolymer (c-11) (for Comparative Example)

30 wt parts of styrene, 31.3 wt parts of acrylonitrile, 0.2 wt parts of maleic anhydride and 0.3 wt parts of 2,2'-azobisisobutylonitrile were fed to a stainless steel autoclave equipped with a baffle and pfaudler type impellers in which 60 wt parts of methylethyl ketone had been fed, and this solution was heated to 80° C. while stirring at 300 rpm. Next, a solution in which 37.5 wt parts of styrene, 1.0 wt parts of maleic anhydride and 0.2 wt parts of 2,2'-azobisisobutylonitrile are dissolved in 60 wt parts of methylethyl ketone was continuously added for 5 hours. After the addition, the temperature was further maintained at 80° C. for 3 hours and the polymerization was completed. After cooling, the solution was poured into methanol of a five-fold equivalent, purified by reprecipitation, completely removed the solvent by drying, and obtained a copolymer (c-11). The polymer yield was 93%. By infrared absorption spectrum measurement, the composition determined by an infrared absorption spectrum calibration curve was that which contains 67.9 wt % of styrene unit, 30.8 wt % of acrylonitrile unit and 1.3 wt % of maleic anhydride unit. And, the copolymer (c-11) was adjusted to 0.4 g/100 ml (in methylethyl ketone, 30° C.), and the intrinsic viscosity measured by an Ubbelohde viscometer at 30° C. was 0.84 dl/g. The copolymer (c-11) differs from the copolymer (C) of the present invention in the intrinsic viscosity and in the content of α,β-unsaturated carboxylic anhydride.

Reference Example 18

Preparation of Copolymer (c-12) (for Comparative Example)

80 wt parts of acrylamide, 20 wt parts of methyl methacrylate, 0.3 wt parts of potassium persulfate and 1,500 wt parts of ion exchanged water were fed to a reactor, the gaseous phase in the reactor was replaced with nitrogen gas, and maintained at 70° C. while well stirring the reaction mixture. The reaction was continued until the monomers were completely converted to a polymer and an aqueous solution of two components copolymer of acrylamide and methyl methacrylate was obtained. By diluting with ion exchanged water, a solution, in which 0.05 parts of methyl methacrylate/acrylamide copolymer is dissolved in 165 parts of ion exchanged water, was obtained.

In a stainless steel autoclave of 20 liter volume equipped with a baffle and pfaudler type impellers, the solution, in which 0.05 parts of methyl methacrylate/acrylamide copolymer is dissolved in 165 parts of ion exchanged water, was stirred at 400 rpm, and the reaction system was replaced with nitrogen gas. Next, the following mixture was added while mixing the reaction system, heated to 60° C. and a suspension polymerization was started.

| | |
|---|---|
| Styrene: | 70 wt parts |
| Acrylonitrile: | 25 wt parts |
| Methyl methacrylate: | 5 wt parts |
| t-dodecyl mercaptan: | 0.4 wt parts |
| 2,2'-azobisisobutylonitrile: | 0.2 wt parts |

After elevating the reaction temperature to 65° C. in 15 minutes, the reaction mixture was heated to 90° C. in 2 hours and maintained at 90° C. for 2 hours to complete the polymerization. The reaction system was cooled, the polymer was separated, washed, dried and obtained a vinyl-based copolymer (c-12) in beads state. The polymer yield was 96%. By infrared absorption spectrum measurement, the composition determined by an infrared absorption spectrum calibration curve was that which contains 70 wt % of styrene unit, 25 wt % of acrylonitrile unit and 5 wt % of methyl methacrylate unit. And, the copolymer (c-12) was adjusted to 0.4 g/100 ml (in methylethyl ketone, 30° C.), and the intrinsic viscosity measured by an Ubbelohde viscometer at 30° C. was 0.59 dl/g. The copolymer (c-12) differs from the copolymer (C) of the present invention in that it does not contain α,β-unsaturated carboxylic anhydride unit and in the intrinsic viscosity.

Reference Example 19

Preparation of Copolymer (c-13) (for Comparative Example)

120 parts of pure water and 0.3 parts of potassium persulfate were fed to a polymerization container and heated to 65° C. while being stirred. When the inside temperature reached 65° C., it was considered as the starting point of polymerization, and a mixture consisting of 67 wt parts of styrene, 30 wt parts of acrylonitrile, 3 wt parts of methacrylic acid and 1.5 wt parts of t-dodecyl mercaptan and 30 parts of an aqueous emulsifier solution containing 2 parts of sodium dodecylbenzene sulfonate were respectively added continuously for 5 hours. Successively, the polymerization system was heated to 70° C., and the polymerization was carried out for 3 hours to complete the polymerization. After that, by salting out, dehydration and drying with calcium chloride, a copolymer (c-1) was obtained. At this time, the polymer yield was 95%. By infrared absorption spectrum measurement, the composition determined by an infrared absorption spectrum calibration curve was that which contains 67 wt % of styrene unit, 30 wt % of acrylonitrile unit and 5 wt % of methyl methacrylate unit. Furthermore, this copolymer (c-13) was adjusted to 0.4 g/100 ml (in methylethyl ketone, 30° C.), and the intrinsic viscosity measured by an Ubbelohde viscometer at 30° C. was 0.31 dl/g. The copolymer (c-13) differs from the copolymer (C) of the present invention in that it does not contain $\alpha,\beta$-unsaturated carboxylic anhydride unit.

Reference Example 20

Preparation of Copolymer (c-14) (for Comparative Example)

90 wt parts of methyl methacrylate, 8 wt parts of styrene and 2 wt parts of maleic anhydride were dissolved in 150 wt parts of methylethyl ketone, and 0.14 wt parts of t-dodecyl mercaptan and 0.3 wt parts of 2,2'-azobisisobutylonitrile were added to carry out polymerization at 80° C. for 6 hours. After cooling, the solution was poured into methanol of a five-fold equivalent and purified to obtain a copolymer. This copolymer was hot air dried at 80° C. for 12 hours and obtained a copolymer (c-14) which contains 90 wt % of methyl methacrylate unit, 8 wt % of styrene unit and 2 wt % of maleic anhydride unit. Furthermore, this copolymer (c-14) was adjusted to 0.4 g/100 ml (in methylethyl ketone, 30° C.), and the intrinsic viscosity measured by an Ubbelohde viscometer at 30° C. was 0.38 dl/g. The copolymer (c-14) differs from the copolymer (C) of the present invention in that it does not contain vinyl cyanide-based monomer unit.

Reference Example 21

Preparation of Copolymer (c-15) (for Comparative Example)

92 wt parts of styrene and 8 wt parts of maleic anhydride were dissolved in 130 wt parts of methylethyl ketone, and 0.8 wt parts of t-dodecyl mercaptan and 0.3 wt parts of 2,2'-azobisisobutylonitrile were added thereto and a solution polymerization was carried out at 80° C. for 6 hours. After cooling, the solution was poured into methanol of a five-fold equivalent and purified to obtain a copolymer. This copolymer was hot air dried at 80° C. for 12 hours and obtained a copolymer (c-15) which contains 92 wt parts of styrene unit and 8 wt parts of maleic anhydride unit. And, this copolymer (c-15) was adjusted to 0.4 g/100 ml (in methylethyl ketone, 30° C.), and the intrinsic viscosity measured by an Ubbelohde viscometer was 0.15 dl/g. The copolymer (c-15) differs from the copolymer (C) of the present invention in that it does not contain a vinyl cyanide-based monomer unit.

Polyamide Resin (B)

Reference Example 22

Polyamide resin (B) (b-1): Nylon 6 of which relative viscosity of the solution dissolved at 1 g/dl in 98% concentrated sulfuric acid is 2.3 at 25° C., was used.

Reference Example 23

Polyamide resin (B) (b-2): Nylon 6 of which relative viscosity of the solution dissolved at 1 g/dl in 98% concentrated sulfuric acid is 2.9 at 25° C., was used.

Reference Example 24

Polyamide resin (B) (b-3): Nylon 6 of which relative viscosity of the solution dissolved at 1 g/dl in 98% concentrated sulfuric acid is 3.8 at 25° C., was used.

Reference Example 25

Polyamide resin (B) (b-4): A copolymer of Nylon 6 and Nylon 66 of which relative viscosity of the solution dissolved at 1 g/dl in 98% concentrated sulfuric acid is 2.5 at 25° C., was used.

Reference Example 26

Polyamide resin (B) (b-5): Nylon 66 of which relative viscosity of the solution dissolved at 1 g/dl in 98% concentrated sulfuric acid is 2.4 at 25° C., was used.

Filler (D)

Reference Example 27

Filler (D) (d-1): A carbon fiber of weight average fiber length of 6 mm and number average fiber diameter of 10 μm, was used.

Reference Example 28

Filler (D) (d-2): Chopped strand of a glass fiber having a fiber diameter of 13 μm (product of Nippon Electric Glass, product's name: ECS03T-351) was used.

Reference Example 29

Filler (D) (d-3): A talc of which average particle diameter is 4.5 μm, a ratio of $SiO_2$ and MgO is 98%, and a whiteness is 95% or more (product of Fuji Talc Industrial Co., product's name: LMS300) was used.

Stratified Silicate (E)

Reference Example 30

Preparation of Swellable Stratified Silicate (E) (e-1)

100 g of Na type montmorillonite (Kunimine Industries: Kunipia F, cation exchange capacity of 120 meq/100 g) was dispersed by stirring in 10 liter of hot water and thereto 2 liter of hot water in which 51 g of benzyldimethyloctadecyl ammonium chloride (equivalent to the cation exchange capacity) was dissolved was added and stirred for one hour. After filtering a precipitate generated, it washed with hot water. This washing and filtering operations were repeated 3 times and the obtained solid was vacuum dried at 80° C. to obtain a stratified silicate (e-1). An amount of inorganic ash of the obtained swellable stratified silicate (e-1) was measured and it was found to be 68 wt %. Here, the determination of the inorganic ash depends on the value obtained by firing 0.1 g of swellable stratified silicate for 3 hours in an electric furnace of 600° C.

Reference Example 31

Preparation of Polyamide Resin Containing Stratified Silicate (b-6)

After 8 wt parts of the above mentioned swellable stratified silicate (e-1) was mixed to 100 wt parts of the above mentioned polyamide resin (b-1) and they were fed to an upstream feeder of a double screwed extruder of same rotational direction with screw diameter of 30 mm and L/D of 44.5 (TEX-30 of The Japan Steel works) and by melt-kneading at resin temperature of 250° C., screw rotation of 150 rpm, a polyamide resin which contains stratified silicate (b-6) was obtained. The obtained polyamide resin which contains stratified silicate (b-6) was pelletized and then vacuum dried at 80° C. for 10 hours.

Reference Example 32

Preparation of Polyamide Resin Containing Stratified Silicate (b-7)

After 3 wt parts of the above mentioned swellable stratified silicate (e-1) was mixed to 100 wt parts of the above mentioned polyamide resin (b-1) and they were fed to an upstream feeder of a double screwed extruder of same rotational direction with screw diameter of 30 mm and L/D of 44.5 (TEX-30 of The Japan Steel works) and by melt-kneading at resin temperature of 250° C., screw rotation of 150 rpm, a polyamide resin which contains stratified silicate (b-7) was obtained. The obtained polyamide resin which contains stratified silicate (b-7) was pelletized and then vacuum dried at 80° C. for 10 hours.

Examples 1 to 5

The styrene-based resin (A), the polyamide resin (B) and the copolymer (C) prepared by the reference examples were mixed in the mixing ratios show in Table 1, and then they were melt-kneaded and extruded by a double screwed extruder of same rotational direction with screw diameter of 30 mm and L/D of 25 (PCM-30 of Ikegai Tekko) at resin temperature of 250° C., screw rotation of 150 rpm, to make pellets. The respective pellets were subjected to injection molding under conditions of molding temperature of 250° C. and mold temperature of 70° C. to prepare respective test pieces and their physical characteristics were evaluated. Those results are shown in Table 1.

Comparative Examples 1 to 4

The styrene-based resin (A), the polyamide resin (B) and the copolymer for comparative examples prepared in the reference examples were mixed in the mixing ratios shown in Table 1, and then respective test pieces were prepared according to the same way as Examples 1 to 5, and their physical characteristics were evaluated. Those results are shown in Table 1.

Comparative Examples 5 and 6

The graft copolymer (A-1), the vinyl-based copolymer (a-6), a polyamide resin (B) and the copolymer (C) prepared in the reference examples were mixed in the mixing ratios shown in Table 1, and then test pieces were prepared according to the same way as Examples 1 to 5, and their physical characteristics were evaluated. Those results are shown in Table 1. Comparative examples 5 and 6 differ from the resin composition of the present invention in that it does not contain the vinyl-based (co)polymer (A-2).

TABLE 1

| | | | Example | | | | | Comp. example | | | | | |
|---|---|---|---|---|---|---|---|---|---|---|---|---|---|
| | | | 1 | 2 | 3 | 4 | 5 | 1 | 2 | 3 | 4 | 5 | 6 |
| (a-1) | Ref. example 1 | | 35 | 35 | — | 35 | 35 | 35 | 35 | 35 | 35 | — | 35 |
| (a-2) | Ref. Example 2 | | — | — | 45 | — | — | — | — | — | — | 55 | — |
| (a-4) | Ref. example 4 | | 15 | — | — | — | — | 15 | — | 15 | 15 | — | — |
| (a-5) | Ref. example 5 | | — | 20 | 10 | 20 | 15 | — | 20 | — | — | — | — |
| (a-6) | Ref. example 6 | | — | — | — | — | — | — | — | — | — | — | 20 |
| (b-1) | Ref. example 22 | | 50 | 45 | 45 | 45 | 50 | 50 | 45 | 50 | 50 | 45 | 45 |
| (c-1) | Ref. example 7 | | 5 | — | — | — | — | — | — | — | — | — | — |
| (c-3) | Ref. example 9 | | — | 5 | — | — | — | — | — | — | — | — | — |
| (c-4) | Ref. example 10 | | — | — | 5 | — | — | — | — | — | — | 5 | 5 |
| (c-6) | Ref. example 12 | | — | — | — | 5 | — | — | — | — | — | — | — |
| (c-7) | Ref. example 13 | | — | — | — | — | 8 | — | — | — | — | — | — |
| (c-9) | Ref. example 15 | | — | — | — | — | — | 5 | — | — | — | — | — |
| (c-10) | Ref. example 16 | | — | — | — | — | — | — | 5 | — | — | — | — |
| (c-14) | Ref. example 20 | | — | — | — | — | — | — | — | 5 | — | — | — |
| (c-15) | Ref. example 21 | | — | — | — | — | — | — | — | — | 2 | — | — |
| Izod impact strength | 23° C. | J/m | 874 | 799 | 904 | 910 | 936 | 708 | 673 | 197 | 552 | 780 | 570 |
| | −30° C. | J/m | 290 | 251 | 310 | 314 | 340 | 204 | 189 | 70 | 85 | 240 | 130 |
| Flexural modulus | | GPa | 2.2 | 2.2 | 2.2 | 2.2 | 2.2 | 2.1 | 2.1 | 1.9 | 1.9 | 2.1 | 2.1 |
| Heat deflection temperature | | ° C. | 110 | 110 | 110 | 110 | 110 | 109 | 109 | 108 | 109 | 109 | 109 |
| Melt flow rate | | g/10 min. | 63 | 58 | 65 | 72 | 66 | 33 | 29 | 30 | 33 | 53 | 38 |
| Critical strain | Methanol | % | * | * | * | * | * | 1.3 | 1.3 | 0.85 | 1.3 | * | 1.1 |
| | Gasoline | % | * | * | * | * | * | 1.3 | 1.2 | 0.9 | 1.3 | * | 1 |
| Surface appearance 1 | | | 5 | 5 | 5 | 5 | 5 | 3 | 3 | 3 | 2 | 4 | 4 |
| Surface glossiness | | % | 91 | 91 | 92 | 93 | 92 | 79 | 73 | 76 | 75 | 83 | 84 |

*: this means that the critical strain is 1.4% or more.

Examples 6 to 8

The styrene-based resin (A), the polyamide resin (B) and the copolymer (C) prepared in the reference examples were mixed in the mixing ratios shown in Table 2, and then test pieces were prepared according to the same way as Examples 1 to 5 and their physical characteristics were evaluated. Those results are shown in Table 2.

Comparative Examples 7 to 10

The styrene-based resin (A), the polyamide resin (B) and the copolymer for comparative examples prepared in the reference examples were mixed in the mixing ratios shown in Table 2, and then test pieces were prepared according to the same way as Examples 1 to 5, and their physical characteristics were evaluated. Those results are shown in Table 2.

Examples 9 and Comparative Example 11

The styrene-based resin (A), the polyamide resin (B) and the copolymer (C), or the copolymer for comparative examples prepared by the reference examples were mixed in the mixing ratios show in Table 2, and then they were melt-kneaded and extruded by a double screwed extruder of same rotational direction with screw diameter of 30 mm and L/D of 25 (PCM-30 of Ikegai Tekko) at resin temperature of 280° C., screw rotation of 150 rpm, to make pellets. The respective pellets were subjected to injection molding under conditions of molding temperature of 280° C. and mold temperature of 80° C. to prepare respective test pieces and their physical characteristics were evaluated. Those results are shown in Table 2.

Examples 10 to 12

The styrene-based resin (A), the polyamide resin (B) and the copolymer (C) prepared by the reference examples were mixed in the mixing ratios show in Table 3, then fed to an upstream feeder of a double screwed extruder of same rotational direction with screw diameter of 30 mm and L/D of 44.5 (TEX-30 of The Japan Steel works), and the filler (D) of Reference examples 27 to 29 was fed to a side feeder, and they were melt-kneaded and extruded at resin temperature of 250° C., screw rotation of 150 rpm, to make pellets. The respective pellets were subjected to injection molding under conditions of molding temperature of 250° C. and mold temperature of 70° C. to prepare respective test pieces and their physical characteristics were evaluated. Those results are shown in Table 3.

Comparative Example 12 and 13

The styrene-based resin (A), the polyamide resin (B) and the copolymer for comparative examples prepared by the reference examples were mixed in the mixing ratios shown in Table 3, then fed to an upstream feeder of a double screwed extruder of same rotational direction with screw diameter of 30 mm and L/D of 44.5 (TEX-30 of The Japan Steel works), and the filler (D) of Reference examples 27 and 28 was fed to a side feeder, and they were melt-kneaded and extruded at a resin temperature of 250° C., screw rotation of 150 rpm, to make pellets. The respective pellets were subjected to injection molding under conditions of molding temperature of 250° C. and mold temperature of 70° C. to prepare respective test pieces and their physical characteristics were evaluated. Those results are shown in Table 3.

TABLE 2

|  |  |  | Example | | | | Comp. example | | | | |
| --- | --- | --- | --- | --- | --- | --- | --- | --- | --- | --- | --- |
|  |  |  | 6 | 7 | 8 | 9 | 7 | 8 | 9 | 10 | 11 |
| (a-1) | Ref. example 1 |  | — | 35 | 35 | 35 | — | 35 | 35 | 30 | 35 |
| (a-2) | Ref. example 2 |  | — | — | — | — | 55 | — | — | — | — |
| (a-3) | Ref. example 3 |  | 35 | — | — | — | — | — | — | — | — |
| (a-4) | Ref. example 4 |  | — | 20 | 20 | 20 | — | 20 | 20 | 10 | 20 |
| (a-5) | Ref. example 5 |  | 20 | — | — | — | — | — | — | — | — |
| (b-1) | Ref. example 22 |  | — | — | — | — | — | — | — | — | — |
| (b-2) | Ref. example 23 |  | 45 | — | — | — | 45 | — | — | 60 | — |
| (b-3) | Ref. example 24 |  | — | 45 | — | — | — | 45 | — | — | — |
| (b-4) | Ref. example 25 |  | — | — | 45 | — | — | — | 45 | — | — |
| (b-5) | Ref. example 26 |  | — | — | — | 45 | — | — | — | — | 45 |
| (c-1) | Ref. example 7 |  | — | 5 | 5 | 5 | — | — | — | — | — |
| (c-5) | Ref. example 11 |  | 5 | — | — | — | — | — | — | — | — |
| (c-9) | Ref. example 15 |  | — | — | — | — | 5 | — | — | — | — |
| (c-10) | Ref. example 16 |  | — | — | — | — | — | 5 | 5 | — | 5 |
| (c-11) | Ref. example 17 |  | — | — | — | — | — | — | — | 8 | — |
| Izod impact strength | 23° C. | J/m | 764 | 756 | 776 | 665 | 700 | 293 | 476 | 695 | 384 |
|  | −30° C. | J/m | 235 | 224 | 230 | 159 | 194 | 78 | 116 | 166 | 80 |
| Flexural modulus |  | GPa | 2.3 | 2.3 | 2.2 | 2.2 | 2.1 | 2.2 | 2.2 | 2.2 | 2.2 |
| Heat deflection temperature |  | ° C. | 109 | 110 | 110 | 118 | 109 | 109 | 109 | 109 | 116 |
| Melt flow rate |  | g/10 min. | 56 | 39 | 54 | 57 | 21 | 7 | 27 | 10 | 25 |
| Critical strain | Methanol | % | * | * | * | * | 1.05 | 0.55 | 0.6 | 1.3 | 1.1 |
|  | Gasoline | % | * | * | * | * | 1.0 | 0.4 | 0.55 | 1.3 | 1.1 |
| Surface appearance 1 |  |  | 5 | 5 | 5 | 5 | 3 | 1 | 3 | 2 | 1 |
| Surface glossiness |  | % | 90 | 90 | 89 | 88 | 67 | 66 | 74 | 66 | 68 |

*: this means that the critical strain is 1.4% or more.

TABLE 3

|  |  | Examples | | | Comp. example | |
|---|---|---|---|---|---|---|
|  |  | 10 | 11 | 12 | 12 | 13 |
| (a-1) | Reference example 1 | 28 | 28 | 28 | 28 | 28 |
| (a-4) | Reference example 4 | 14 | 14 | 14 | 14 | 14 |
| (b-1) | Reference example 22 | 50 | 50 | 50 | 50 | 50 |
| (c-4) | Reference example 10 | 8 | — | — | — | — |
| (c-6) | Reference example 12 | — | — | 8 | — | — |
| (c-8) | Reference example 14 | — | 8 | — | — | — |
| (c-12) | Reference example 18 | — | — | — | 8 | — |
| (c-13) | Reference example 19 | — | — | — | — | 8 |
| (d-1) | Reference example 27 | 5 | — | — | 5 | — |
| (d-2) | Reference example 28 | — | 10 | — | — | 10 |

TABLE 3-continued

|  |  | Examples | | | Comp. example | |
|---|---|---|---|---|---|---|
|  |  | 10 | 11 | 12 | 12 | 13 |
| (d-3) | Reference example 29 | — | — | 12 | — | — |
| Izod impact strength | 23° C. J/m | 101 | 96 | 172 | 57 | 78 |
|  | −30° C. J/m | 60 | 54 | 90 | 27 | 37 |
| Flexural modulus | GPa | 4.4 | 3.6 | 2.7 | 4.2 | 3.5 |
| Heat deflection temperature | ° C. | 210 | 190 | 127 | 199 | 185 |
| Melt flow rate | g/10 min. | 28 | 32 | 43 | 14 | 18 |
| Surface appearance 2 |  | 5 | 5 | 5 | 2 | 3 |
| Coatability |  | ○ | ○ | ○ | X | Δ |
| Surface glossiness | % | 87 | 87 | 88 | 64 | 66 |

Examples 13 to 16

The styrene-based resin (A), the polyamide resin (B), the polyamide resin which contains stratified silicate, a copolymer (C) and the stratified silicate (E) prepared by the reference examples were mixed in the mixing ratios show in Table 4, and then they were melt-kneaded and extruded by a double screwed extruder of same rotational direction with screw diameter of 30 mm and L/D of 25 (PCM-30 of Ikegai Tekko) at resin temperature of 250° C., screw rotation of 150 rpm, to make pellets. The respective pellets were subjected to injection molding under conditions of molding temperature of 250° C. and mold temperature of 70° C. to prepare respective test pieces and their physical characteristics were evaluated. Those results are shown in Table 4.

Comparative Examples 14 to 16

The styrene-based resin (A), the polyamide resin containing stratified silicate and the copolymer for comparative examples prepared in the reference examples were mixed in the mixing ratios shown in Table 4, and then respective test pieces were prepared according to the same way as Examples 13 to 16, and their physical characteristics were evaluated. Those results are shown in Table 4.

TABLE 4

|  |  |  | Examples | | | | Comp. example | | |
|---|---|---|---|---|---|---|---|---|---|
|  |  |  | 13 | 14 | 15 | 16 | 14 | 15 | 16 |
| (a-1) | Reference example 1 |  | 35 | 30 | 27 | 27 | 35 | 35 | 35 |
| (a-4) | Reference example 4 |  | 10 | 25 | 23 | 23 | 15 | 10 | 10 |
| (b-1) | Reference example 22 |  | — | 15 | — | 50 | — | — | — |
| (b-6) | Reference example 31 |  | 59.4 | 32.4 | — | — | 54 | 59.4 | 59.4 |
| (b-7) | Reference example 32 |  | — | — | 51.5 | — | — | — | — |
| (c-6) | Reference example 12 |  | — | — | 6 | 6 | — | — | — |
| (c-8) | Reference example 14 |  | 6 | 4 | — | — | — | — | — |
| (c-12) | Reference example 18 |  | — | — | — | — | 7 | — | — |
| (c-13) | Reference example 19 |  | — | — | — | — | — | 6 | 15 |
| (e-1) | Reference example 30 |  | — | — | — | 1.5 | — | — | — |
| Izod impact strength | 23° C. | J/m | 221 | 220 | 197 | 180 | 168 | 100 | 164 |
|  | −30° C. | J/m | 104 | 110 | 103 | 88 | 77 | 55 | 71 |
| Flexural modulus |  | GPa | 2.8 | 2.7 | 2.7 | 2.7 | 2.6 | 2.5 | 2.6 |
| Heat deflection temperature |  | ° C. | 140 | 135 | 138 | 138 | 128 | 126 | 132 |
| Melt flow rate |  | g/10 min. | 43 | 44 | 47 | 45 | 15 | 27 | 15 |
| Surface appearance 2 |  |  | 5 | 5 | 5 | 5 | 2 | 3 | 2 |
| Coatability |  |  | ○ | ○ | ○ | ○ | Δ | Δ | Δ |
| Surface glossiness |  | % | 87 | 87 | 88 | 87 | 64 | 66 | 64 |

Examples 17 to 23

The styrene-based resin (A), the polyamide resin (B) and the copolymer (C) prepared by the reference examples were mixed in the mixing ratios show in Table 5, and then they were melt-kneaded and extruded by a double screwed extruder of same rotational direction with screw diameter of 30 mm and L/D of 25 (PCM-30 of Ikegai Tekko) at resin temperature of 250° C., screw rotation of 150 rpm, to make pellets. The respective pellets were subjected to injection molding under conditions of molding temperature of 250° C. and mold temperature of 70° C. to prepare respective test pieces and their physical characteristics were evaluated. Those results are shown in Table 5.

Comparative Examples 17 to 19

The styrene-based resin (A), the polyamide resin (B) and the copolymer for comparative examples prepared in the reference examples were mixed in the mixing ratios shown in Table 5, and then respective test pieces were prepared according to the same way as Examples 17 to 23, and their physical characteristics were evaluated. Those results are shown in Table 5.

TABLE 5

|  |  |  | Example | | | | | | | Comp. example | | |
|---|---|---|---|---|---|---|---|---|---|---|---|---|
|  |  |  | 17 | 18 | 19 | 20 | 21 | 22 | 23 | 17 | 18 | 19 |
| (a-1) | Ref. example 1 | | 35 | 30 | 30 | 35 | 33 | 40 | 35 | 30 | 30 | 35 |
| (a-4) | Ref. example 4 | | 28 | 45 | 39 | — | 32 | — | 32 | 45 | 39 | 25 |
| (a-5) | Ref. example 5 | | — | — | — | 35 | — | 35 | — | — | — | — |
| (b-1) | Ref. example 22 | | 37 | 25 | 16 | 30 | 35 | 25 | — | 25 | 16 | — |
| (b-2) | Ref. example 23 | | — | — | 15 | — | — | — | 33 | — | 15 | — |
| (b-3) | Ref. example 24 | | — | — | — | — | — | — | — | — | — | 40 |
| (c-1) | Ref. example 7 | | — | — | — | — | 4 | — | 4 | — | — | — |
| (c-2) | Ref. example 8 | | 4 | — | — | — | — | — | — | — | — | — |
| (c-6) | Ref. example 12 | | — | — | 4 | 3 | — | 3 | — | — | — | — |
| (c-7) | Ref. example 13 | | — | 3 | — | — | — | — | — | — | — | — |
| (c-9) | Ref. example 15 | | — | — | — | — | — | — | — | 3 | 4 | 5 |
| Izod impact | 23° C. | J/m | 763 | 821 | 851 | 835 | 758 | 800 | 755 | 157 | 175 | 186 |
| strength | −30° C. | J/m | 263 | 310 | 335 | 337 | 241 | 321 | 250 | 53 | 63 | 70 |
| Flexural modulus | | GPa | 2.3 | 2.3 | 2.3 | 2.2 | 2.3 | 2.2 | 2.2 | 2.1 | 2.1 | 2.1 |
| Heat deflection temperature | | ° C. | 110 | 109 | 111 | 110 | 110 | 108 | 110 | 104 | 103 | 106 |
| Melt flow rate | | g/10 min. | 61 | 75 | 62 | 75 | 62 | 56 | 45 | 33 | 17 | 13 |
| Critical strain | Methanol | % | * | * | * | * | * | * | * | 0.2 | 0.3 | 0.45 |
|  | Gasoline | % | * | * | * | * | * | * | * | 0.2 | 0.3 | 0.3 |
| Surface appearance 1 | | | 5 | 5 | 5 | 5 | 5 | 5 | 5 | 3 | 2 | 1 |
| Surface glossiness | | % | 96 | 96 | 96 | 97 | 96 | 97 | 95 | 72 | 75 | 66 |
| Melt viscosity ratio | | | 4.0 | 2.3 | 2.1 | 3.2 | 3.3 | 3.6 | 2.3 | 2.3 | 2.1 | 1.5 |
| Phase structure 1 | | | 4 | 3 | 3 | 3 | 4 | 3 | 4 | 0 | 0 | 0 |
| Phase structure 2 | | | 3 | 4 | 4 | 4 | 3 | 4 | 3 | 0 | 0 | 0 |

*: this means that the critical strain is 1.4% or more.

From Examples and Comparative examples, the following facts were found.

From Table 1 and Table 2, it was found that the resin compositions of Examples 1 to 9 to which specific copolymers (C) having specific intrinsic viscosities are added are, compared to the resin compositions of Comparative examples 1 to 4 and 7 to 11, excellent in impact resistance, flowability as well as having the same level or more of rigidity, heat resistance and chemical resistance, and, further, have an especially excellent surface appearance. In addition, from a comparison of Example 1 to 5 and Comparative examples 5 and 6, it was found that a resin composition excellent in impact resistance and flowability, and excellent also in surface appearance and surface glossiness, can be obtained, by using the copolymer (C) together with the specified vinyl-based (co)polymer (A-2).

From Table 3, it was found that the resin composition of Examples 10 to 12 of the present invention, to which specified copolymers (C) are added, compared to the resin composition of Comparative examples 12 and 13, are excellent in impact resistance, heat resistance and coatability, and are especially excellent in flowability and surface appearance.

From Table 4, it was found that the resin composition of Example 13 to 16 of the present invention, to which specified copolymers (C) are added, compared to the resin composition of Comparative examples of 14 to 16, are excellent in impact resistance, rigidity, heat resistance and coatability, and especially excellent in flowability and surface appearance.

From Table 5, it was found that the resin compositions of Examples 17 to 23 of the present invention, to which specified copolymers (C) are added, and have a specified phase structure in which the polyamide resin (B) forms a portion of continuous phase in the center portion of molded article, though the polyamide resin (B) is the smaller component than the styrene-based resin (A), compared to the resin composition of Comparative examples 17 to 19 in which the polyamide resin (B) does not form a portion of continuous phase in the center portion of molded article, are excellent in rigidity, heat resistance and chemical resistance, and in addition to being especially excellent in impact resistance and flowability, they are extremely excellent in surface appearance, especially in surface glossiness.

INDUSTRIAL APPLICABILITY

The resin composition of the present invention can advantageously used, taking advantage of the above mentioned excellent characteristics, especially for interior or exterior materials of automobiles, housing, parts or the like of electric or electronic devices.

The invention claimed is:

1. A thermoplastic resin composition characterized as containing 100 wt parts of components (A)+(B), consisting of
   (A) 55 to 85 wt % of a styrene-based resin, in which (A-I) is a graft (co)polymer obtained by graft polymerizing to a rubbery polymer, monomer units comprising 100 to 40 wt % of an aromatic vinyl-based monomer and 0 to 60 wt % of at least one other monomer; and (A-2) a (co)polymer consisting of 100 to 50 wt % of polymerized aromatic vinyl-based monomer units and 0 to 50 wt % of at least one other polymerized monomer unit, wherein components (A-1)+(A-2) consist of 5 to 95 wt % of (A-1) and 5 to 95 wt % (A-2); and
   (B) 45 to 15 wt % of a polyamide resin, said polyamide resin being selected from the group consisting of polycaprolactam (Nylon 6), polyhexamethylene adipamide (Nylon 66), polyundecaneamide (Nylon 11), polydodecaneamide (Nylon 12), polyhexamethylene sebacamide (Nylon 610), and mixtures thereof; and
   (C) 0.5 to 30 wt parts of a copolymer, which contains 1.5 to 10 wt % of polymerized α,β-unsaturated carboxylic anhydride units and 0.5 to 60 wt % of polymerized vinyl cyanide-based monomer units, wherein
   the intrinsic viscosity of the copolymer (C) dissolved in methylethyl ketone and measured at 30° C. is in the range of 0.15 to 0.41 dl/g; and wherein a molded article obtained by melt-mold processing of said resin composition has a glossiness of at least 87% at an incidence angle of 60°.

2. The thermoplastic resin composition according to claim 1, wherein the intrinsic viscosity of the modified vinyl-based copolymer (C) dissolved in methylethyl ketone solvent and measured at 30° C. is in the range of 0.15 to 0.30 dl/g.

3. The thermoplastic resin composition according to claim 1, wherein a 0.1 to 150 wt parts of a filler (D) is further contained with respect to 100 wt parts of the total of the styrene-based resin (A), the polyamide resin (B) and the modified vinyl-based copolymer (C).

4. The thermoplastic resin composition according to claim 1, wherein a 0.05 to 40 wt parts of stratified silicate (E) is further contained with respect to 100 wt parts of the total of the styrene-based resin (A), the polyamide resin (B)-based.

5. The thermoplastic resin composition according to claim 4, characterized in that the stratified silicate (E) disperses uniformly in a level of 10 layers or less in the styrene-based resin (A) and/or the polyamide resin (B).

6. The thermoplastic resin composition according to claim 1, characterized in that, in a molded article obtained by melt-mold processing of said resin composition, when a direction perpendicular to the surface of the molded article is defined as thickness, a part where the polyamide resin (B) forms a continuous phase is 10 volume % or more in a phase structure observed by electron micrograph in 40 to 60% depth of the total thickness.

7. The thermoplastic resin composition according to claim 6, characterized in that, the part where the polyamide resin (B) forms a continuous phase is 30 volume % or more.

8. The thermoplastic resin composition according to claim 1, characterized in that, in a molded article obtained by melt-mold processing of said resin composition, when a direction perpendicular to the surface of the molded article is defined as thickness, a part where the graft (co)polymer (A-1) and/or the vinyl-based (co)polymer (A-2) form a continuous phase is 5 volume % or more in a phase structure observed in electron micrograph in 40 to 60% depth of the total thickness.

9. A molded article obtained by melt-mold processing the thermoplastic resin composition described in claim 1.

10. The thermoplastic resin composition according to claim 1, wherein components (A)+(B) consist of 55 to 70 wt % of the styrene-based resin and (B) 45 to 30 wt % of the polyamide resin.

11. The thermoplastic resin composition according to claim 1, wherein components (A-1)+(A-2) consist of 5 to 80 wt % of (A-1) and 20 to 95 wt % of (A-2).

12. The thermoplastic resin composition according claim 1, containing 0.5 to 15 it parts of (C).

13. The thermoplastic resin composition according claim 1, containing 3 to 13 wt parts of (C).

* * * * *